(12) United States Patent
Kinne

(10) Patent No.: US 7,484,049 B1  
(45) Date of Patent: Jan. 27, 2009

(54) DATA STORAGE SYSTEM PACKER/DEPACKER

(75) Inventor: Jeffrey S. Kinne, Needham, MA (US)

(73) Assignee: EMC Corporation, Hopkinton, MA (US)

(*) Notice: Subject to any disclaimer, the term of this patent is extended or adjusted under 35 U.S.C. 154(b) by 864 days.

(21) Appl. No.: 10/623,234

(22) Filed: Jul. 18, 2003

(51) Int. Cl.
- *G06F 12/00* (2006.01)
- *G06F 13/00* (2006.01)
- *G06F 13/28* (2006.01)
- *G06F 9/26* (2006.01)
- *G06F 9/34* (2006.01)

(52) U.S. Cl. ............ 711/154; 711/200; 711/201
(58) Field of Classification Search ............ 711/154
See application file for complete search history.

(56) References Cited

U.S. PATENT DOCUMENTS

| | | | | |
|---|---|---|---|---|
| 5,638,367 A | * | 6/1997 | Gaytan et al. | 370/471 |
| 6,026,450 A | * | 2/2000 | Kaganoi et al. | 710/33 |
| 6,466,581 B1 | * | 10/2002 | Yee et al. | 370/428 |
| 6,567,902 B1 | * | 5/2003 | Padmanabhan et al. | 711/165 |
| 6,865,656 B2 | * | 3/2005 | Turner et al. | 711/165 |

* cited by examiner

*Primary Examiner*—Hyung S Sough  
*Assistant Examiner*—Gary W Cygiel

(57) ABSTRACT

A system for aggregating portions of multiple blocks of data into a single composite block. The block of data comprises different packets of data stored in correspondingly different sections of a memory. The system gathers selected portions of the stored packets and then transfers the selected portions of the gathered packets into a transmitted block of data having the selected portions appended contiguously one to the other. The memory stores the packets in word-based locations, the word-based locations having a common word width, W. The stored packets have a variable number of bytes. The bytes of the gathered selected portions of the stored packets are offset from an initial byte position of the stored packets. The packets have variable offsets. Also, a disclosed is a system for distributing packets stored contiguously in a memory to a plurality of different non-contiguous memory locations.

2 Claims, 27 Drawing Sheets

DATA STORAGE SYSTEM PACKER/DEPACKER

INCORPORATION BY REFERENCE

This application incorporates by reference, in their entirety, the following co-pending patent applications all assigned to the same assignee as the present invention:

| INVENTORS | FILING DATE | SER. NO. | TITLE |
|---|---|---|---|
| Yuval Ofek et al. | Mar. 31, 2000 | 09/540,828 | Data Storage System Having Separate Data Transfer Section And Message Network |
| Paul C. Wilson et al. | Jun. 29, 2000 | 09/606,730 | Data Storage System Having Point-To-Point Configuration |
| John K. Walton et al. | Jan. 22, 2002 | 10/054,241 | Data Storage System (Divisional of 09/223,519 filed Dec. 30, 1998) |
| Christopher S. MacLellan et al. | Dec. 21, 2000 | 09/745,859 | Data Storage System Having Plural Fault Domains |
| John K. Walton | May 17, 2001 | 09/859,659 | Data Storage System Having No-Operation Command |
| Ofer Porat et al | Mar. 31, 2003 | 10/403,262 | Data Storage System |

TECHNICAL FIELD

This invention relates generally to data storage systems and more particularly to data packers/unpackers used in such systems.

BACKGROUND

As is known in the art, large host computers and servers (collectively referred to herein as "host computer/servers") require large capacity data storage systems. These large computer/servers generally includes data processors, which perform many operations on data introduced to the host computer/server through peripherals including the data storage system. The results of these operations are output to peripherals, including the storage system.

One type of data storage system is a magnetic disk storage system. Here a bank of disk drives and the host computer/server are coupled together through an interface. The interface includes "front end" or host computer/server controllers (or directors) and "back-end" or disk controllers (or directors). The interface operates the controllers (or directors) in such a way that they are transparent to the host computer/server. That is, data is stored in, and retrieved from, the bank of disk drives in such a way that the host computer/server merely thinks it is operating with its own local disk drive. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. patent, the interface may also include, in addition to the host computer/server controllers (or directors) and disk controllers (or directors), addressable cache memories. The cache memory is a semiconductor memory and is provided to rapidly store data from the host computer/server before storage in the disk drives, and, on the other hand, store data from the disk drives prior to being sent to the host computer/server. The cache memory being a semiconductor memory, as distinguished from a magnetic memory as in the case of the disk drives, is much faster than the disk drives in reading and writing data. The cache memory thus provides a global memory for the system.

As is also known in the art, some protocols used by the host computer/server, such as ECSON and FICON are byte-oriented. That is, each I/O data to be transferred (i.e., an I/O transfer) is made up of one or more time-separated packets. Thus, there may be a requirement to assemble contiguous word-aligned data streams based on scatter/gather descriptor lists which describe byte-oriented data. That is, in some protocols, the data is fed to the interface in discrete, time separated, packets with each packet being stored in different sections of a shared memory included in the director. When all packets associated with a particular I/O data to be transferred transfer are collected, the entire I/O is then transferred to the global memory.

SUMMARY

In accordance with the present invention, a system is provided for storing a block of data. The block of data comprises different packets of data stored in correspondingly different sections of a memory. The system gathers selected portions of the stored packets and then transfers the selected portions of the gathered packets into a transmitted block of data having the selected portions appended contiguously one to the other. The memory stores the packets in word-based locations, the word-based locations having a common word width, W. The stored packets have a variable number of bytes. The bytes of the gathered selected portions of the stored packets are offset from an initial byte position of the stored packets. The packets have variable offsets. The system includes a sampling register having W byte locations for storing W bytes read from a selected one of the word-based locations of the memory, such read bytes being bytes of a currently gathered one of the packets. The system also includes a shifter for shifting the bytes stored in the sampling register, such bytes being shifted as a function of the offset of the currently gathered one of the packets and the number of bytes in a prior gathered one of the packets. An accumulator register having W byte locations is provided for storing the shifted bytes in response to a clock pulse. A staging register having W byte locations is provided for storing the bytes stored in the accumulator register in response to a subsequent clock pulse. A multiplexer is provided having a W sections, each of the W sections being coupled to a corresponding one of the W byte locations of the accumulator register and a corresponding one of the W byte locations of the staging register. Each one of the sections couples to an output thereof the byte location of the accumulator register or the byte location of the staging register selectively in accordance with the number of bytes in the prior gathered ones of the packets and the number of bytes being gathered from the currently gathered one of the packets to provide at an output of the multiplexer bytes to be transmitted as the transmitted block of data having the selected portions appended contiguously one to the other.

A system for distributing different packets of data stored in continuous locations of a memory. The memory stores the packets in word-based locations, the word-based locations having a common word width, W. The stored packets have a variable number of bytes, the bytes of the distributed packets to be offset from initial byte positions, the offsets being variable. The system includes a sampling register having W byte locations for storing W bytes read from a selected one of the word-based locations of the memory, such read bytes being bytes of a currently distributed one of the packets. A shifter is provided for shifting the bytes stored in the sampling register, such bytes being shifted as a function of the offset of the currently distributed one of the packets and the number of bytes in a prior distributed one of the packets. An accumulator register is provided having W byte locations for storing the shifted bytes in response to a clock pulse. A staging register is provided having W byte locations, for storing the bytes stored in the accumulator register in response to a subsequent clock pulse. A multiplexer is provided having a W sections, each of the W sections being coupled to a corresponding one of the W byte locations of the accumulator register and a corresponding one of the W byte locations of the staging register, each one of the sections coupling to an output thereof the byte location of the accumulator register or the byte location of the staging register selectively in accordance with the number of bytes in the prior distributed ones of the packets and the number of bytes being distributed from the currently distributed one of the packets to provide at an output of the multiplexer.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
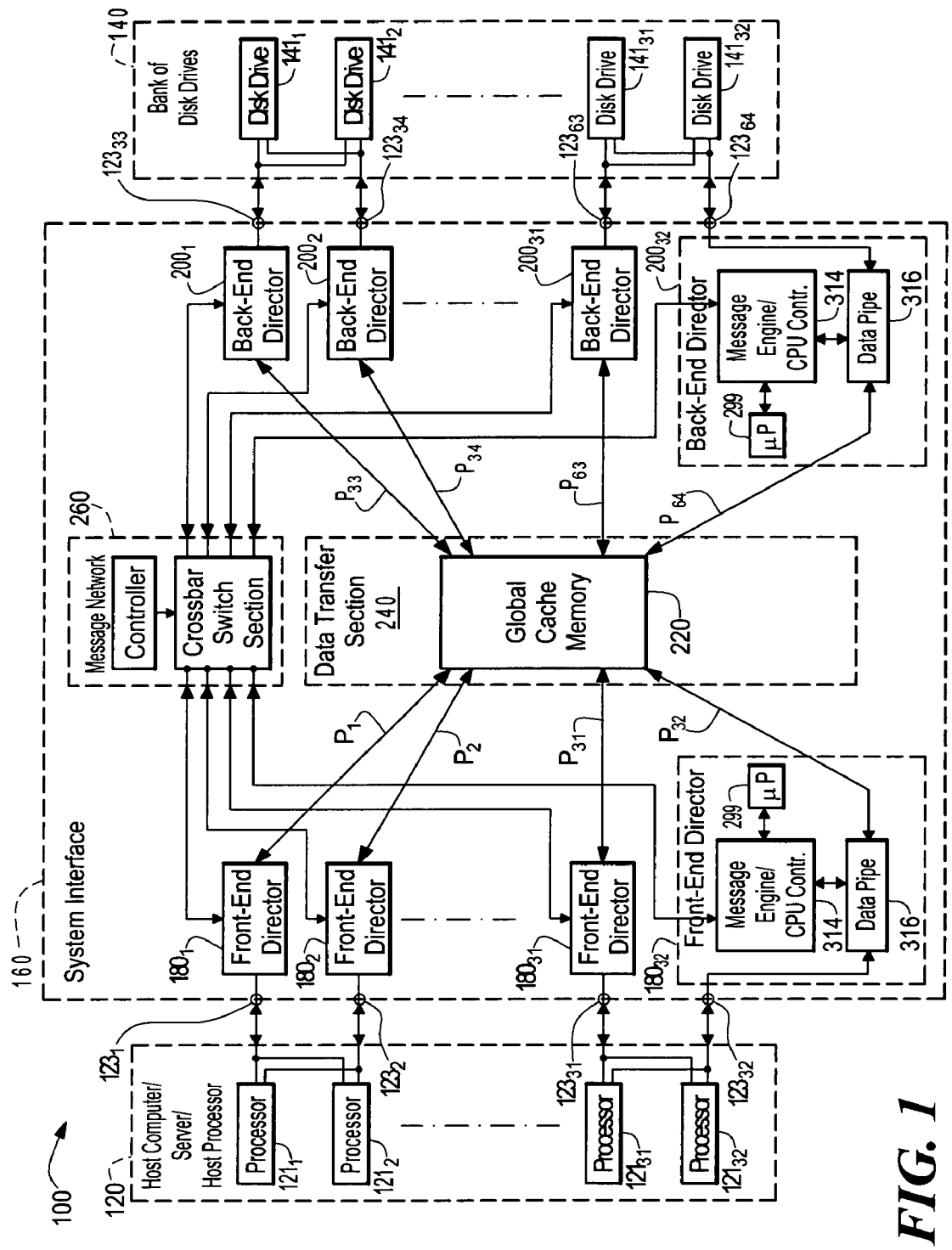
FIG. 1 is a block diagram of a data storage system according to the invention.

Referring now to FIG. 1, a data storage system 100 is shown for transferring data between a host computer/server 120 and a bank of disk drives 140 through a system interface 160. The system interface 160 includes: a plurality of, here 32 front-end directors $180_1$-$180_{32}$ coupled to the host computer/server 120 via ports $123_1$-$123_{32}$; a plurality of back-end directors $200_1$-$200_{32}$ coupled to the bank of disk drives 140 via ports $123_{33}$-$123_{64}$; a data transfer section 240, having a global cache memory 220, coupled to the plurality of front-end directors $180_1$-$180_{16}$ and the back-end directors $200_1$-$200_{16}$; and a messaging network 260, operative independently of the data transfer section 240, coupled to the plurality of front-end directors $180_1$-$180_{32}$ and the plurality of back-end directors $200_1$-$200_{32}$, as shown. The front-end and back-end directors $180_1$-$180_{32}$, $200_1$-$200_{32}$ are functionally similar and include a microprocessor (μP) 299 (i.e., a central processing unit (CPU) and RAM), a message engine/CPU controller 314 and a data pipe 316, described in detail in the co-pending patent applications referred to above. Suffice it to say here, however, that the front-end and back-end directors $180_1$-$180_{32}$, $200_1$-$200_{32}$ control data transfer between the host computer/server 120 and the bank of disk drives 140 in response to messages passing between the directors $180_1$-$180_{32}$, $200_1$-$200_{32}$ through the messaging network 260. The messages facilitate the data transfer between host computer/server 120 and the bank of disk drives 140 with such data passing through the global cache memory 220 via the data transfer section 240.

It is noted that in the host computer 120, each one of the host computer processors $121_1$-$121_{32}$ is coupled to here a pair (but not limited to a pair) of the front-end directors $180_1$-$180_{32}$, to provide redundancy in the event of a failure in one of the front end-directors $181_1$-$181_{32}$ coupled thereto. Likewise, the bank of disk drives 140 has a plurality of, here 32, disk drives $141_1$-$141_{32}$, each disk drive $141_1$-$141_{32}$ being coupled to here a pair (but not limited to a pair) of the back-end directors $200_1$-$200_{32}$, to provide redundancy in the event of a failure in one of the back-end directors $200_1$-$200_{32}$ coupled thereto). Thus, front-end director pairs $180_1$, $180_2$; . . . $180_{31}$, $180_{32}$ are coupled to processor pairs $121_1$, $121_2$; . . . $121_{31}$, $121_{32}$, respectively, as shown. Likewise, back-end director pairs $200_1$, $200_2$; . . . $200_{31}$, $200_{32}$ are coupled to disk drive pairs $141_1$, $141_2$; . . . $141_{31}$, $141_{32}$, respectively, as shown.

Figure 2:
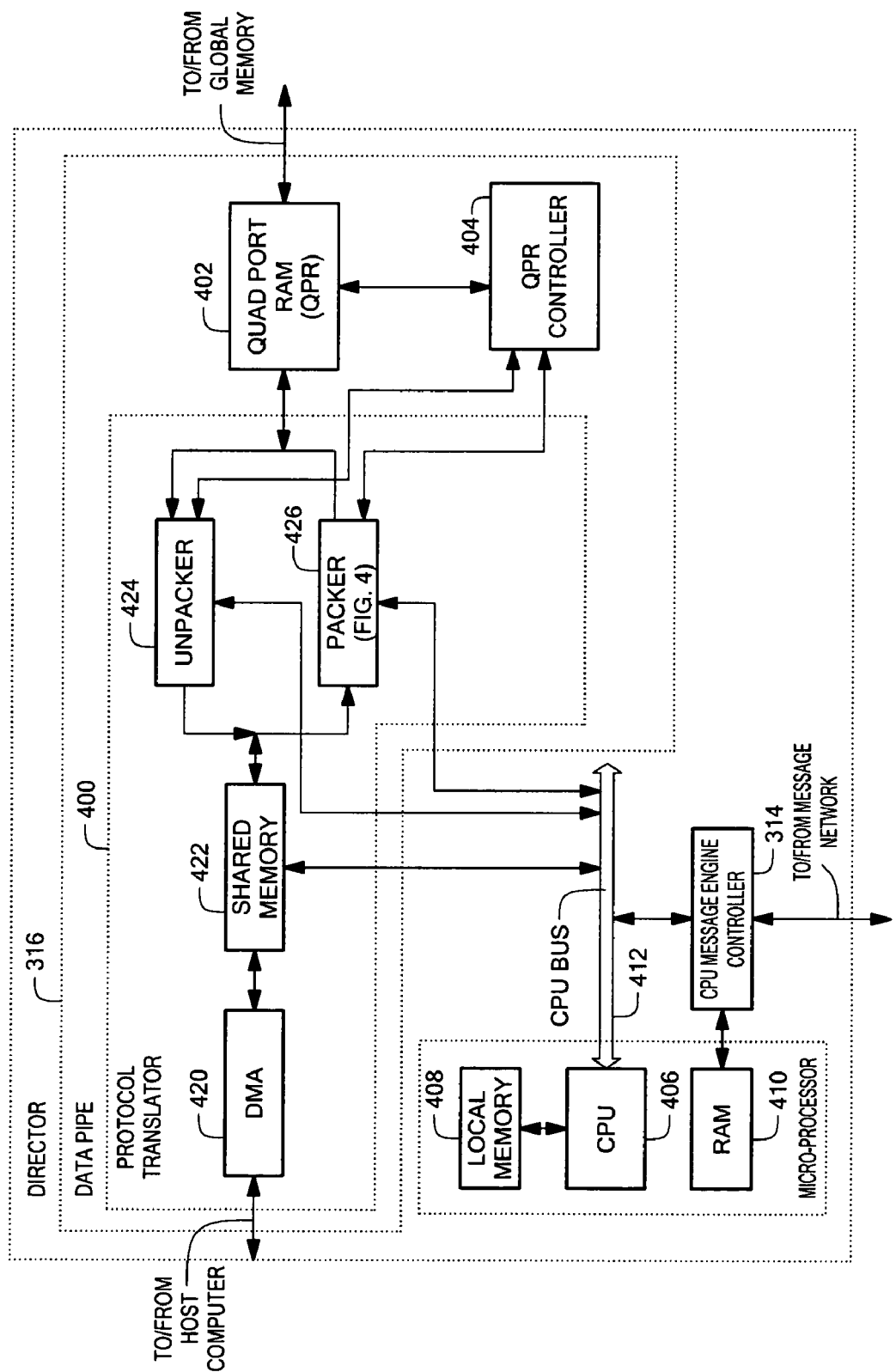
FIG. 2 is a block diagram of one of the front-end directors used in the system of FIG. 1.

Referring now to FIG. 2, an exemplary one of the directors is shown in more detail. Further detail is provided in the above-referenced patent applications. Thus, the data pipe 316 includes a protocol translator 400, for translating between the protocol of the host computer/server 120 (FIG. 1) and the global memory, a quad port RAM (QPR 402), and a QPR controller 404. The microprocessor 299 includes a CPU 406, a local memory 408 and a RAM 410. The microprocessor 299, CPU/Message engine controller 314 and data pipe 406 are interconnected through a CPU bus 412, as shown.

The data pipe 400 includes a DMA 420, a shared memory 422 a packer 426 and an unpacker 424 all arranged as shown. The packer 426 and unpacker 424 will be described in more detail in connection with FIGS. 5 and 6A-6F. Suffice it to say here that the host computer/server uses a packet-oriented protocol such as FICON or iSCSI. That is, each I/O data to be transferred is made up of one or more time separated packets. Thus, there may be a requirement to assemble contiguous word-aligned data streams based on scatter/gather descriptor lists which describes byte-oriented data. That is, the data is fed to the interface 100 (FIG. 1) in discrete, time-separated, packets with each packet being stored in different sections of a shared memory included in the director. When all packets associated with a particular I/O data to be transferred transfer are collected, the entire I/O is then transferred to the global memory 220.

Figure 3:
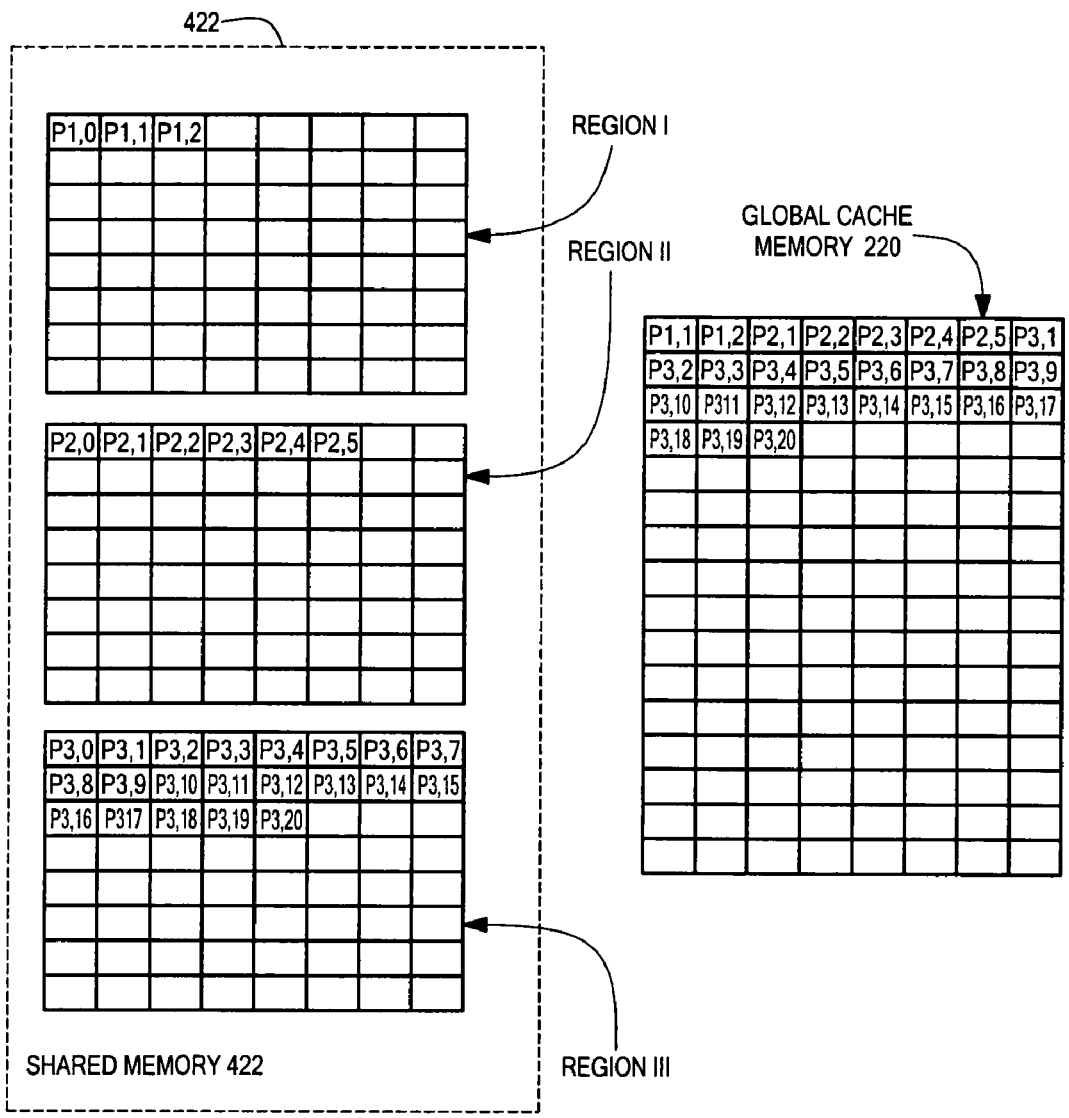
FIG. 3 is a diagram showing packets stored in different regions of a shared memory used in the system of FIG. 1 and locations portions of such packets are to be stored in a global cache memory used in the system of FIG. 1.

More particularly, the packets received from the host computer/server 120 (FIG. 1) are stored in different sections of the shared memory 422, as shown in FIG. 3. Consider for example that the I/O to be transferred is composed of three packets P1, P2, P3. Here, in this example, packet P1 contains three bytes, P1,0; P1,1; and P1,2 stored in region I of the shared memory 422; packet P2 contains six bytes, P2,0; P2,1; P2,2, P2,3, P2,4 and P2,5 stored in region II of the shared memory 422; and packet P3 contains twenty-one bytes, P3,0 through P3,20 stored in region III of the shared memory 422.

Here the shared memory 422 stores the packets in word-based locations, the word-based locations having a common word width, W, here eight bytes. Thus, referring to FIG. 3, the three bytes in packet P1 are stored in only three of the eight byte locations in the first word of region I of the shared memory 422. The six bytes in packet P2 are stored in only six of the eight byte locations in the first word location of region II of the shared memory 422. The twenty one bytes in packet P3 are stored in two full eight byte locations in the first two word locations of region II plus five of the eight byte locations of a third word location in region III of shared memory 422. Thus, the native word size of the shared memory 422 is, in this example, eight bytes. In the example, packets P1 and P2 occupy only a portion of this eight byte native word while packet P3 occupied two full native eight byte words and a portion of a third eight byte native word.

Thus, it is first noted that stored packets have a variable number of bytes. It is next noted that each one of the stored packets may have bytes which are not to be transferred to the global memory. For example, here the first byte of each packet contains a one-byte header information which is not to be stored in the global memory. Thus, while in this example, byte P1,0, P2,0 and P3,0 are not to be stored in the global memory, in other examples it may be desirable to not store more than one byte of each packet. In this example, the third packet P3 has a one-byte header which is not to be transferred. In any event, it follows that in this example, the bytes of each packet to be stored in the global memory are only a fractional portion of the packet stored in the shared memory. Thus, the selected portions of the packets stored in the shared memory to be gathered and then transferred for storage in the global memory have an offset, here, in this example, a one byte offset. More particularly, in the example described above, only bytes P1,1, and P1,2 are to be gathered and stored in the global memory; only bytes P2,1-P2,5 are to be gathered and stored in the global memory; and only bytes P3,1-P3,20 are to be gathered and stored in the global memory. The bytes to be gathered and stored in the memory are hereinafter something referred to as valid bytes.

It should be noted that in this example, the native word of the global cache memory is also eight bytes. Further, it is desired that the desired portions of the entire I/O (i.e., bytes P1,1 and P1,2 of packet P1; bytes P2,1-P2,5 of packet P2; and P3,1-P,20 of packet P3) be stored in consecution locations of the global cache memory 220, as shown in FIG. 3. That is it is desired, in this example, that the first 8 byte word in the global memory section where this I/O is to be stored contain bytes P1,1; P1,2, P2,1, P2,2, P2,3; P2,4, P2,5, and P3,1; the next consecutive word location in the global memory section where this I/O is to be stored contain bytes P3,2; P3,3, P3,4, P3,5, P3,6; P3,7, P3,8, and P3,9; the next consecutive word location in the global memory section where this I/O is to be stored contain bytes P3,10; P3,11, P3,12, P3,13, P3,14; P3,15, P3,16, and P3,17; and; the next consecutive word location in the global memory section where this I/O is to be stored contain bytes P3,18; P3,19 and P3,20.

Figure 4:
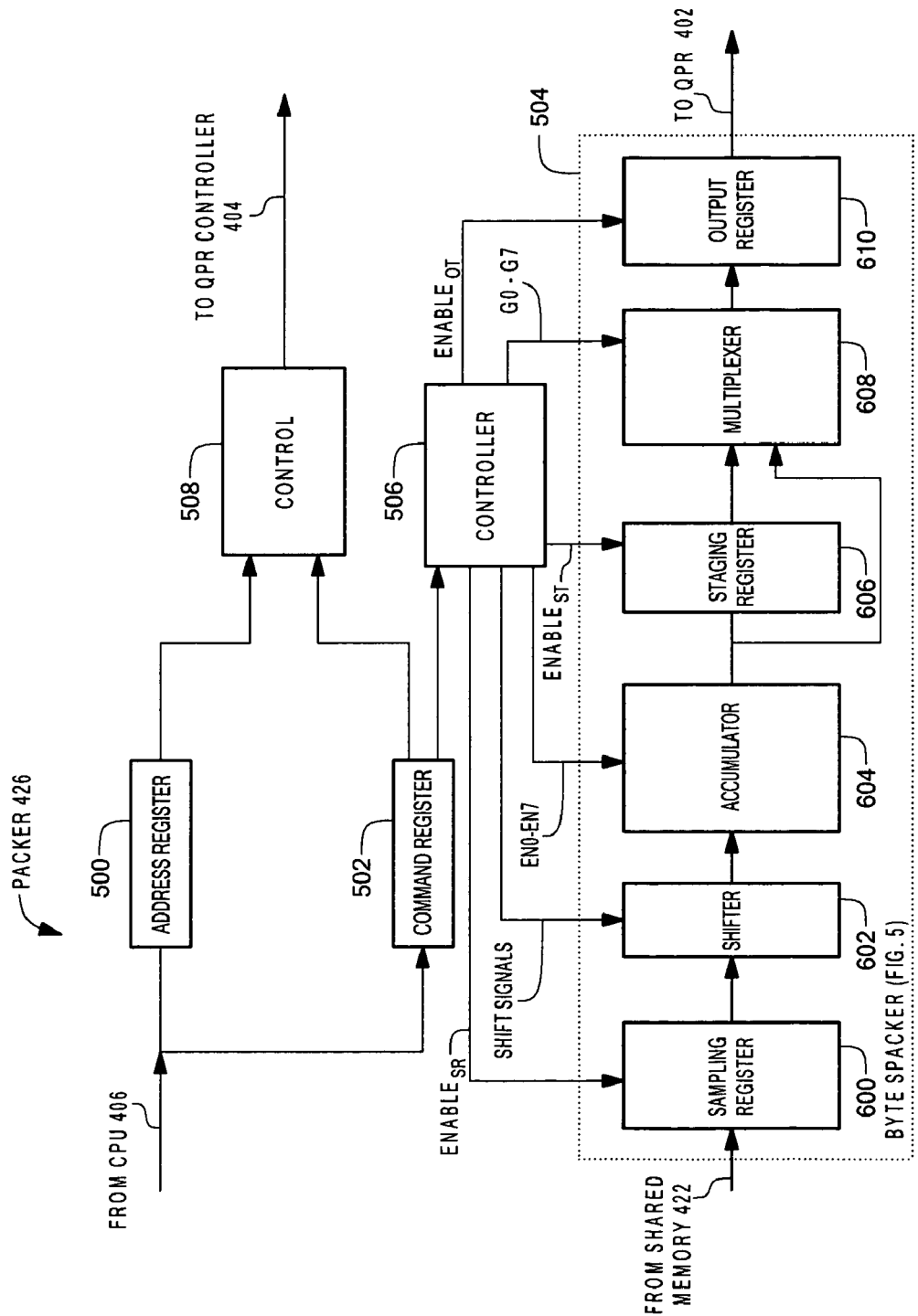
FIG. 4 is a block diagram of a packer used in the director of FIG. 2 to arrange the portions packets stored in the shared memory as shown in FIG. 3 into a block of data for storage in the global cache memory as shown in FIG. 3.

Referring now to FIG. 4, the packer 426 is shown to include an address register 500 and command register 502 for receiving information from the CPU 406 (FIG. 1). The address register 500 receives the address in the shared memory 422 for the packets to be transferred to the global cache memory 220 (FIG. 1). Thus, in the example above, the address register 500 receives the address for byte P1,1 of the first packet, P1, when such first packet is to be read from the shared memory 220. When the second packet, P2, is to be read from the shared memory 220, the address register 500 receives from the CPU, 406 the address in the shared memory 422 of byte P2,1. Likewise, in the example above, when the third packet, P3, is to be read from the shared memory 220, the address register 500 receives from the CPU 406 the address of byte P3,1.

The packing of the read bytes from the shared memory 422 in the manner described above in connection with FIG. 3 is performed by a byte packer 504 in response to control signals provided thereto by controller 506. The controller 506 develops the control signals for the packer 504 in response to packet size (i.e., the number of bytes in the packet read from the shared memory 422) offset information and relative packet position (i.e. first, intermediate or last in a multi-packet transfer) sent to the command register 502 by the CPU 406. Thus, in this example, there are three packets, packet P1 is the first packet, packet P2 is an intermediate packet, and packet P3 is the last packet. It should be understood that in other examples, for example in a six-packet transfer, the second through fifth packets would be the intermediate packets.

A more detailed description of the packer 504 is presented below in connection with FIG. 5. Suffice it to say here, however, that as each set of eight (i.e., the native word length, W) bytes are read from the shared memory 442 they are sent to the QPR 440 in response to control signals sent to the QPR controller 404 (FIG. 2) by controller 508. When the bytes of all three packets, in the example above, are stored in the QPR 402 (FIG. 2), the QPR controller 404 negotiates for QPR 402 access to the global cache memory 220. When access is granted by arbiters, not shown, all three packets are transferred from the QPR 402 in contiguous locations of the global cache memory 220, as described above in connection with FIG. 3.

Figure 5:
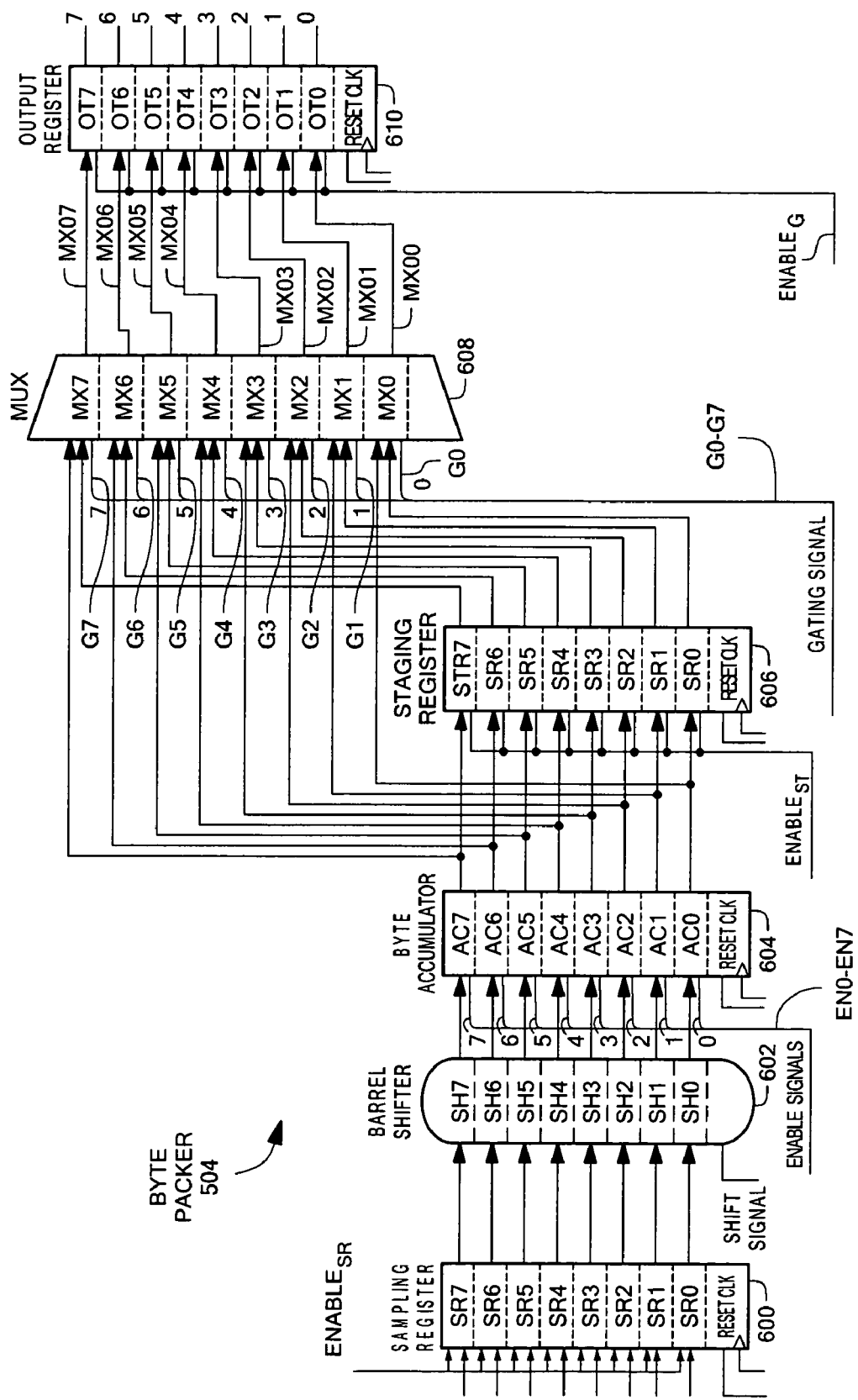
FIG. 5 is a block diagram of a byte packer used in the packer of FIG. 4.

Referring now to FIGS. 4 and 5, the byte packer 504 includes a sampling register 600 for receiving the bytes stored in the shared memory 442 as they are read therefrom in response to control signals provided thereto by the controller 508. The sampling register 600 has W byte locations for storing W bytes read from a selected one of the word-based locations of the memory, such read bytes being bytes of a currently gathered one of the packets.

When sampling register 600 receives each word from shared memory containing a maximum of, in this case eight bytes, (i.e., the native number of bytes in a shared memory location). The bytes are transferred to an accumulator register 604 via a barrel shifter 602. Barrel shifter 602 rotates (i.e., shifts) byte position, i.e., lanes, in accordance with a shift index. As will be described in more detail below in connection with FIGS. 6A-6F, and FIG. 7, the shift index is a function of the offset of the currently gathered one of the packets and the number of bytes in a prior gathered one of the packets.

Accumulator register 604 receives valid bytes from sampling register 602 in response to enabling signals from controller 506. The bytes in the accumulator register 604 are, during a next system clock, potentially transferred to a staging resister 606 in response to enabling signals EN0-EN7 from controller 506. Thus, the accumulator register 604 stores the rotated bytes in response to a clock pulse and the staging register 606 potentially receives the bytes stored in the accumulator register 604 in response to a subsequent clock pulse.

The bytes in the staging register 606, along with bytes now stored in the accumulator 604, are fed to a multiplexer 608. Gating signals are provided to the multiplexer 608 from the controller 506 in a manner to be described. Suffice it to say here however, that the multiplexer 608 couples, in response to the gating signals fed thereto, to an output thereof the byte location of the accumulator register 604 or the byte location of the staging register 606 selectively in accordance with the number of bytes in the prior gathered ones of the packets and the number of bytes being gathered from the currently gathered one of the packets to provide at an output of the multiplexer bytes to be transmitted as the transmitted block of data having the selected portions appended contiguously one to the other.

The output of the multiplexer 608 is then fed to an output register 610. The bytes in the output register 610 are then transferred to the QPR 402 and then transferred by the QPR 402 to the global cache memory 229 (FIG. 1) in the manner described.

Thus, referring again to FIGS. 1 and 2, each one of the directors is a system for storing a block of data, i.e., an I/O data transfer. The block of data comprises different packets of data stored in correspondingly different sections of the shared memory 422. The director gathers selected portions of the stored packets and then transfers the selected portions of the gathered packets into a transmitted block of data. The transmitted block of data has the selected portions appended contiguously one to the other. The shared memory 422 stores the packets in word-based locations, as shown in FIG. 3. The word-based locations having a common word width, W, here, in the example above, eight bytes. The stored packets have a variable number of bytes. Thus, in the example above, the first packet, P1, has two bytes (P1,1 and P1,2) to be gathered (i.e., two valid bytes), the second packet, P2, has five valid bytes (P2,1-P2,5) to be gathered, and the third packet, P3, has twenty valid bytes (P3,1-P3,20) to be gathered.

Further, the bytes in the gathered selected portions of the stored packets are offset from initial byte positions of the stored packets. Thus, the offset for the first packet, P1, in the example above is one byte, the offset for the second packet, P2, is one byte and the offset for the third packet, P3, is one byte. It should be understood that while in this example the three packets have the same one byte offset, the offset for the different packets in the I/O transfer may be variable. Further, it should be understood that while, in the example above, the I/O transfer had three packets, the number of packets in an I/O transfer may be more, or less than, three packets.

Referring to FIG. 5, the byte packer 504 is shown in more detail. The sampling register 600 is shown to include W, here eight, byte locations for storing W bytes read from a selected one of the word-based locations of the shared memory 422, such read bytes being bytes of a currently gathered one of the packets. Thus, the sampling register 600 has byte locations SR0-SR7, as shown. Each one of the byte locations SR0-SR7 stores, in parallel, the bytes in a corresponding one of the word locations of the shared memory 422, it being understood that packet being read may not contain sufficient valid bytes to fill all of the byte locations in the word location being read from the shared memory 422. Thus, in the example described above, the first packet, P1, read from the shared memory 422 has only three valid bytes as shown n FIG. 3, the first byte, P1,0, in such first packet, P1, being a header. The packer 426 (FIG. 2) and unpacker 426, to be described in connection with FIG. 10) are fully synchronous devices (i.e. all registers in the packer and unpacker potentially change state in response to a common edge of a system-wide clock signal, CLK. Further, all registers in the packer and unpacker revert to a known default state in response to the assertion of a system-wide reset signal, RESET. The barrel shifter 602 likewise includes W, here eight, byte positions, i.e., lanes, SH0-SH7. Thus, each one of the byte locations SH0-SH7 of the shifter 602 is coupled to a corresponding one of the byte locations SR0-SR7 of the sampling register 600, respectively as shown in FIG. 5. The barrel shifter 602 rotates the bytes in the locations thereof up or down a number of positions or lanes selectively in accordance with shift signals fed thereto by the controller 506, FIG. 4, as will be described in more detail below in connection with FIGS. 6A through 6F. Suffice it to say here that the bytes in the shifter 602 are shifted in position as a function of the offset of the currently gathered one of the packets stored in the shifter 602 and the number of bytes in a prior gathered one of the packets That is, the shift for the current packet is equal to the destination position in the accumulator 604 for the first byte being gathered minus the position of such first byte in the sampling register 600.

The accumulator register 604 likewise includes W, here eight, byte locations, AC0-AC7, for storing W bytes received from the barrel shifter 602. Thus, each one of the byte locations AC0-AC7 of the accumulator register 604 is coupled to a corresponding one of the byte lanes SH0-SH7 of the barrel shifter 602, respectively as shown in FIG. 5. Thus, the accumulator register 604 has W, here eight byte locations for storing the shifted bytes in response to the clock pulses.

The output byte locations of the accumulator register 604 are fed to the staging register 606 and the multiplexer 608.

The staging register 606 likewise includes W, here eight, byte locations, STR0-STR7, for storing W bytes in the accumulator register 606. Thus, each one of the byte locations STR0-STR7 of the staging register 606 is coupled to a corresponding one of the byte locations AC0-AC7 of the accumulator register 604, respectively as shown in FIG. 5. It follows then that in response to a clock (CLK) the bytes in sampling Register 600 are stored the accumulator register 604 and those bytes in the accumulator register 604 are transferred for storage in the staging register in response to the same clock (CLK).

The multiplexer 608 has W, here eight, sections MX0-MX7. Each one of the W sections, here sections MX0-MX7, is coupled to a corresponding one of the W byte locations, here locations AC0-AC7, respectively, of the accumulator register 604 and a corresponding one of the W byte locations, here byte locations SR0-SR7, respectively, of the staging register 606, as shown in FIG. 5. Each one of the sections MX0-MX7 is fed a gating signal on line G0-G7, respectively. The gating signals on lines G0-G7 are provided by the controller 506, FIG. 4. The multiplexer 608 couples to the outputs MX0-MX7 thereof the byte locations AC0-AC7, respectively, of the accumulator register 604 or the byte locations SR0-SR7, of the staging register SR0-SR7, respectively, selectively in with the gating signals on lines G0-G7, respectively. More particularly, as will be described in more detail in connection with FIGS. 6A-6F, the multiplexer 608 couples to the outputs MX0-MX7 the byte locations of the accumulator register 604 or the byte locations of the staging register 606 selectively in accordance with the number of bytes currently accumulated from the currently gathered one of the packets to provide, at an output of the multiplexer 608, bytes to be transmitted as the transmitted block of data having the selected portions of the packets appended contiguously one to the other for transfer to the global memory 220 (FIG. 1) via the QPR 402 (FIG. 2).

The bytes at the outputs MX0-MX7 of the multiplexer are fed to the byte locations OT0-OT7, respectively, of the output register 610.

As noted above, the packets received from the host computer/server 120 (FIG. 1) are stored in different sections of the shared memory 422, as shown in FIG. 3. Further, considering again the example above, the I/O to be transferred has three packets P1, P2, P3. Here, in this example, packet P1 has three bytes, P1,0; P1,1; and P1,2 stored in section I of the shared memory 422; packet P2 has six bytes, P2,0; P2,1; P2,2, P2,3, P2,4 and P2,5 stored in section II of the shared memory 422; and packet P3 has twenty one bytes, P3,0 through P3,20 stored in section III of the shared memory 422.

Further, as noted in the example above, each one of the stored packets may have bytes which are not to be transferred to the global memory. For example, here the first byte of each packet contains header information which is not to be stored in the global memory. Thus, while in this example, byte P1,0, P2,0 and P3,0 are not to be stored in the global memory. Thus, in this example, only bytes P1,1, and P1,2 are to be gathered and stored in the global memory; only bytes P2,1-P2,5 are to be gathered and stored in the global memory; and only bytes P3,1-P3,20 are to be gathered and stored in the global memory.

It should be noted that in this example, the native word of the global cache memory is also eight bytes. Further, it is desired that the desired portions of the entire I/O (i.e., bytes P1,1 and P1,2 of packet P1; bytes P2,1-P2,5 of packet P2; and P3,1-P,20 of packet P3) be stored in consecutive locations of the global cache memory 220, as shown in FIG. 3. That is it is desired, in this example, that the first 8 byte word in the global memory section where this I/O is to be stored have bytes P1,1; P1,2, P2,1, P2,2, P2,3, P2,4, P2,5, and P3,1; the next consecutive word location in the global memory section where this I/O is to be stored have bytes P3,2; P3,3, P3,4, P3,5, P3,6; P3,7, P3,8, and P3,9; the next consecutive word location in the global memory section where this I/O is to be stored have bytes P3,10; P3,11, P3,12, P3,13, P3,14; P3,15, P3,16, and P3,17; and the next consecutive word location in the global memory section where this I/O is to be stored have bytes P3,18, P3,19 and P3,20.

Figure 6A:
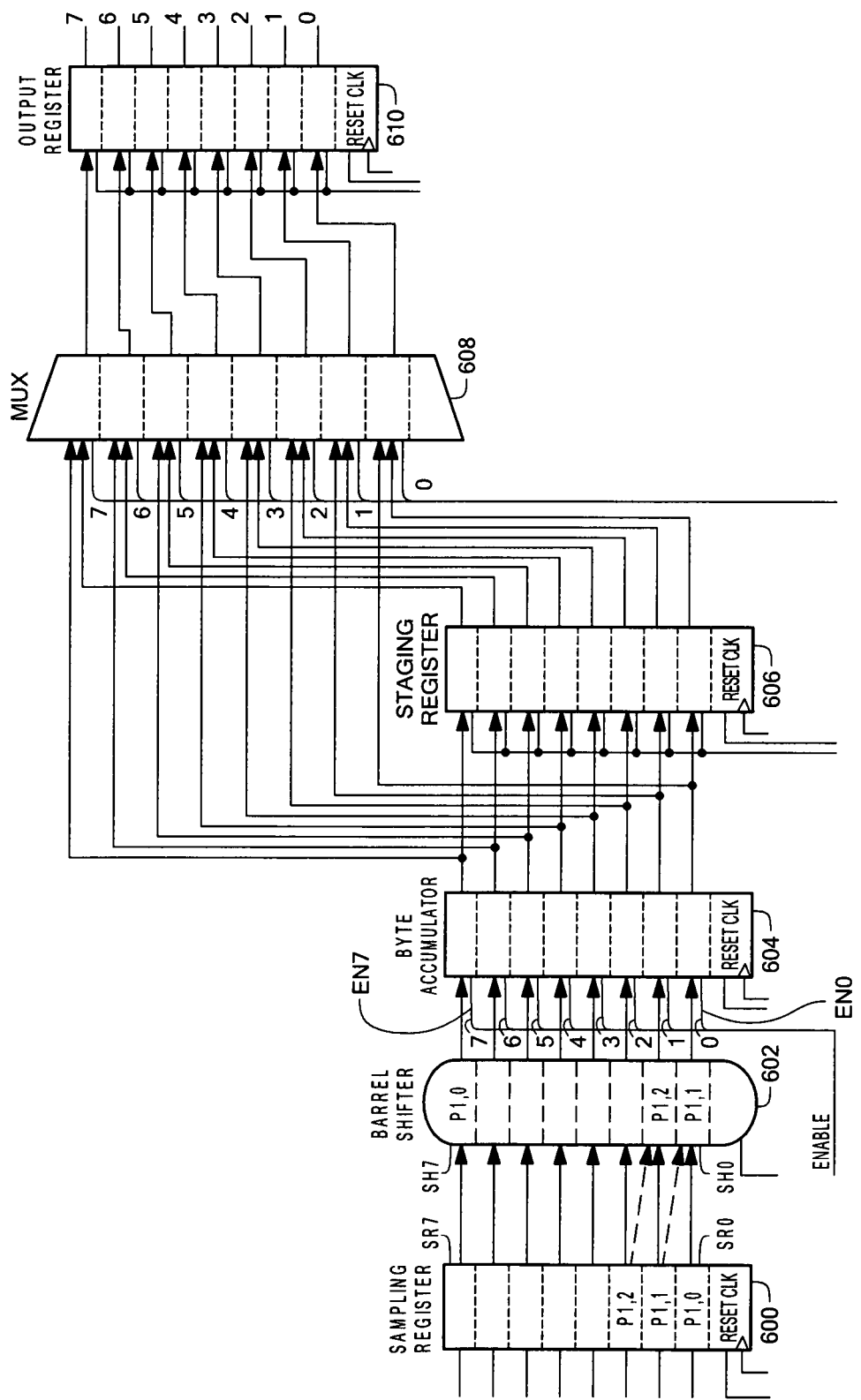
FIG. 6A through FIG. 6H show bytes at various elements of the byte packer of FIG. 5 at various stages in the processing of the packets in the shared memory of FIG. 3.

Referring now to FIGS. 2 and 6A, in this example, the CPU 406 provides the initial address location in the shared memory 422 of the first packet to be read from such shared memory 422 to the packer 424. Here, in this example, the initial source address is P1,1. The CPU 406 also provides to the packer 422 the size, or number of bytes to be transferred to the global cache memory 220. Thus, in this example, the CPU advises the packer 424 that the shared Memory offset is one byte, the global cache memory offset is zero bytes and that the number of bytes to be transferred is two. This first word of packet P1 is read from the shared memory 422 and synchronously loaded into sampling register 600 in response to the LOAD signal announcing it's arrival. Bytes P1,0, P1,1 and P1,2 are stored in locations SR0, SR1 and SR2, respectively, of the sampling register 600, as shown in FIG. 6A. Since the offset is one byte, the "source" byte position of the first byte to be transferred to the global cache memory is lane 1 (i.e., SR1) and accumulator "destination" byte position is lane 0 (i.e., location AC0), the controller 506 provides "shift down one position" control signals to the barrel shifter 602 resulting in byte P1,1 being produced at the output of location SH0 of the barrel shifter 602 and byte P1,2 being produced at the output of location SH1 of the barrel shifter 602, as shown in FIG. 6A. It is noted that enable signals EN0-EN7 are fed to locations AC0-AC7, respectively. Enable signals EN0-EN7 are produced by controller 506. It is noted that only enable signals EN0-EN1 are asserted so that bytes P1,1 and P1,2 are stored in locations AC0 and AC1, respectively, on the first clock following the clock signal which loads the sampling register. This completes the transfer of the desired portion of the first packet, P1. It is noted that the CPU knows, and has indicated to the packer, that there are additional packets, (i.e., one intermediate packet, P2, and the last packet, P3) in this example, to be obtained from the shared memory before the transfer to the global cache memory is complete. Further, the CPU 406 and controller 506 know that the portion of the first packet transferred to the accumulator has only two bytes.

Figure 6B:
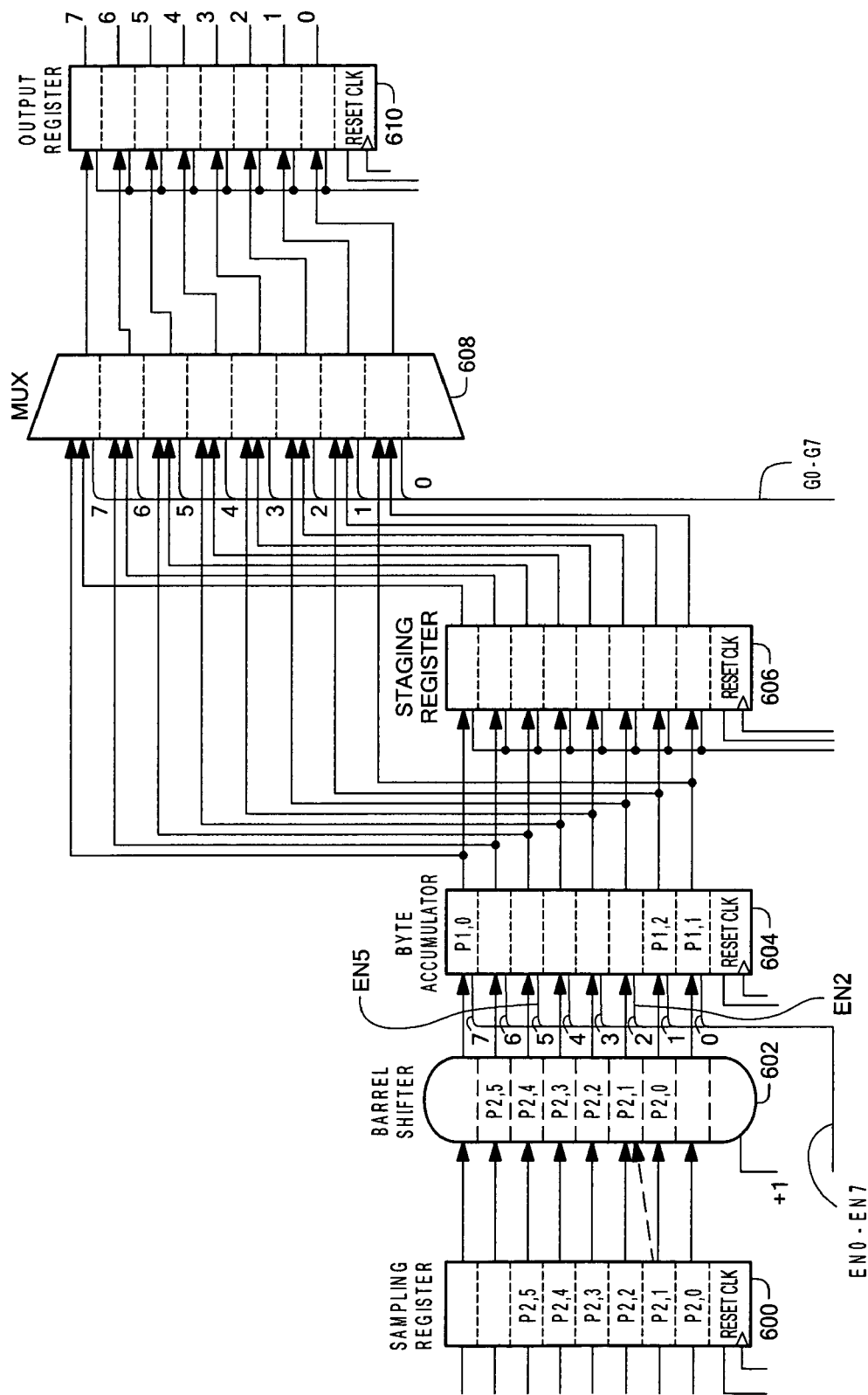

Some time later when the second packet P2 is available in the source (Shared Memory) array, the CPU initiates transfer of the second packet to the packer. In response to a synchronous LOAD signal announcing the arrival of the first word of the second packet bytes P2,0 through P2,5 become stored in locations SR0-SR5 of the sampling register 600, respectively, as shown in FIG. 6B. Because the CPU indicated to the packer when configuring it to transfer the first packet that the first packet was part of a multi-packet transfer, bytes P1,1 and P1,2 are still resident in the accumulator register. As noted above, the second packet contains five valid bytes, i.e., bytes P2,1 through P2,5. Here again, in this example, the CPU has advised the packer 424 that the offset is one byte and that the number of bytes to be transferred is five. Since the offset is one byte, the sampling register "source" byte position of the first byte to be transferred to the global cache memory is lane 1 (i.e., SR1) and accumulator "destination" byte position is lane two (i.e., location AC2), as shown in FIG. 6B, the controller 506 provides a "shift up one position" control signal to the barrel shifter 602 resulting in byte P2,1 being produced at the output of location SH2 of the barrel shifter 602 and bytes P2,2 though P2,5 being produced at the outputs of location SH3-SH6, respectively as shown in FIG. 6B. It is noted that only enable signals EN2-EN6 are asserted. On the first clock following the clock signal which loads the sampling register, bytes P2,1 through P2,5 become stored in locations AC2-AC6, respectively, of the accumulator 604

This completes the transfer of the desired portion of the second packet. It is noted that the CPU had told the Packer that the second packet was not the final packet, in this example, to be obtained from the shared memory before the transfer to the global cache memory is complete. Further, the controller 506 knows that the portion of the second packet transferred to the accumulator contained five valid bytes and thus knows that the Accumulator 604 now contains seven valid bytes and that there is one byte location available in the accumulator register 604, (here location AC7) for the first byte of the desired portion of the third packet.

Figure 6C:
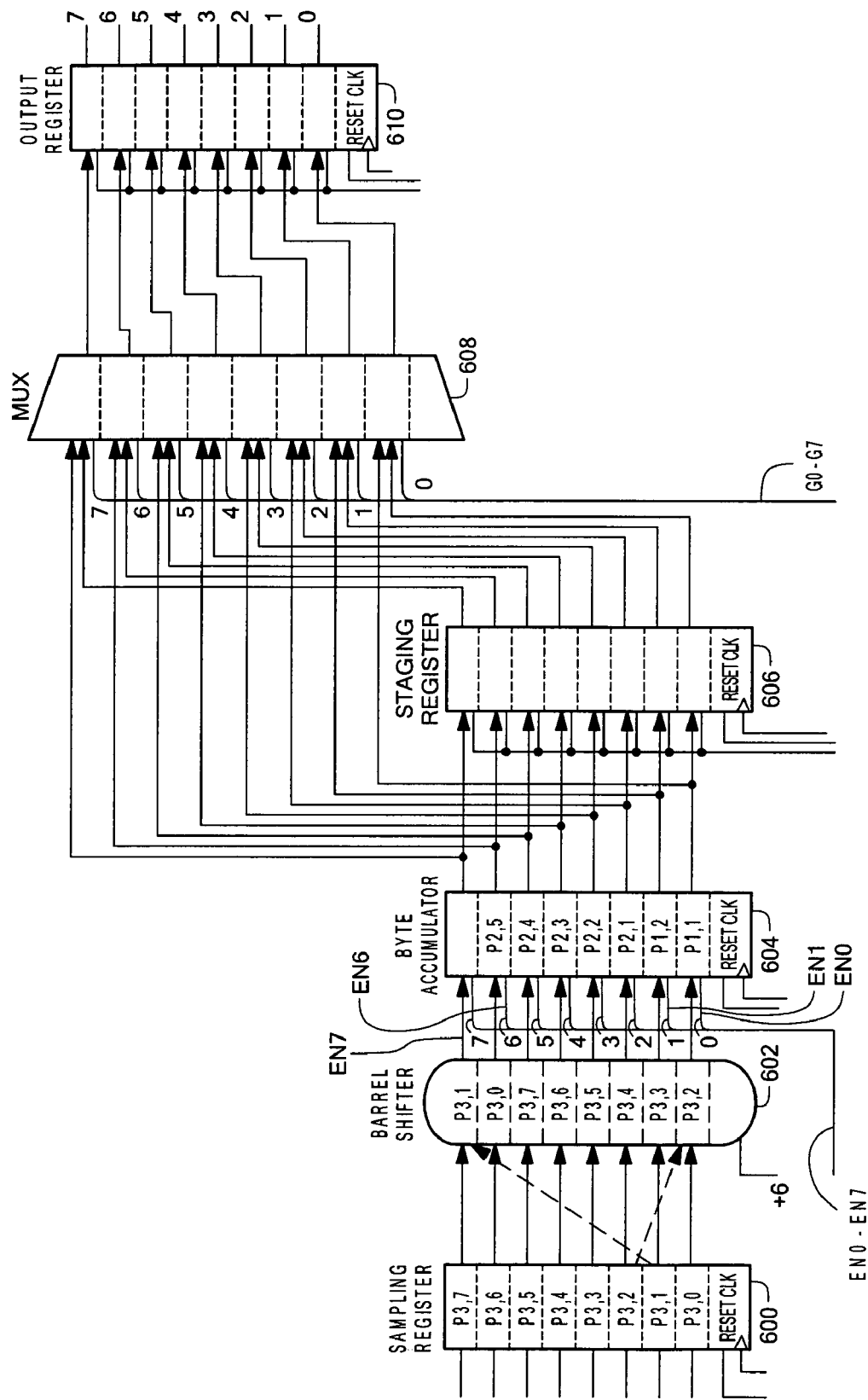

Some time later when the third packet is available, the CPU initiates transfer of the third packet to the packer. In response to a synchronous LOAD signal announcing the arrival of the first word of the third packet bytes P3,0 through P3,7 become stored in locations SR0-SR7 of the sampling register 600, respectively, as shown in FIG. 6C. Because the CPU indicated to the packer when configuring it for preceding packets that such packets were not the final packets, there are still valid bytes, here bytes P1,1, P1,2, P2,1,P2,2,P2,3, P2,4 and P2,5, resident in the accumulator register, as shown in FIG. 6C.

Further, in this example, the CPU advises the packer 424 that the offset is one byte. Here, the CPU advises the packer that the number of bytes to be transferred is twenty. Since the offset is one byte, the "source" byte position of the first byte to be transferred to the global cache memory is lane 1 (i.e., SR1) and accumulator "destination" byte position is lane seven (i.e., location AC7), as shown in FIG. 6C, the controller 506 provides a "shift up six" position control signal to the barrel shifter 602 resulting in byte P3,1 being produced at the output of location SH7 of the barrel shifter 602 and bytes P3,2 though P3,7 being produced at the outputs of location SH0-SH5, respectively, and bytes P3,0 being produced at location SH6 of shifter 602, as shown in FIG. 6C.

Because the valid bytes in the sampling register exceed the number of byte locations available in the accumulator, enable signals EN0-EN7 are asserted and therefore bytes P3,1 to P3,7 are loaded into the positions AC7, AC0-AC5, respectively, as shown in FIG. 6C on the first clock following the clock signal which loads the sampling: register. Thus, the first word of the third packet is loaded into the accumulator.

Figure 6D:
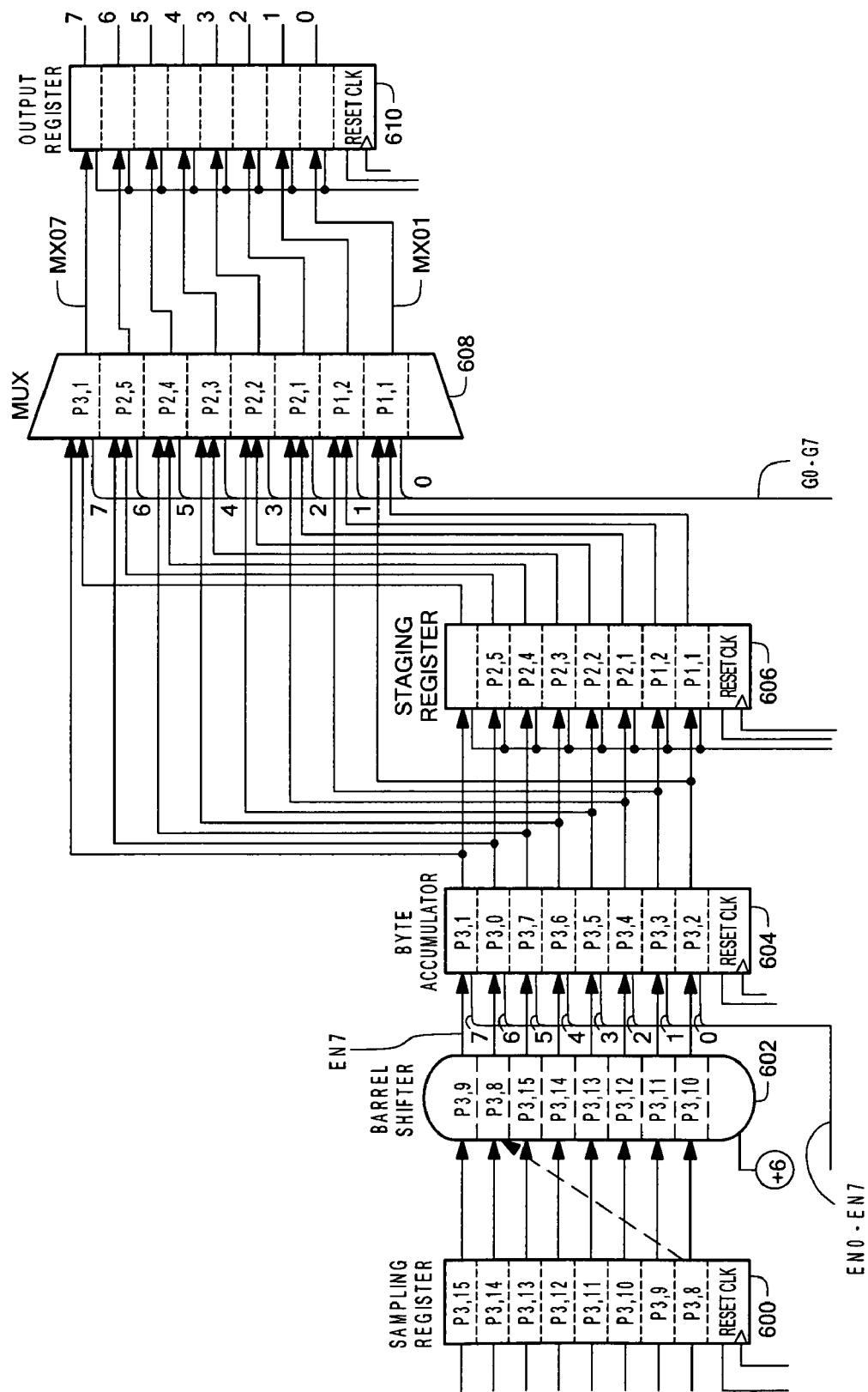

It is noted that concurrently, the entire contents of the accumulator become stored in staging register 606. More particularly, bytes P1,1, P1,2, P2,1, P2,2, P2,3, P2,4 and P2,5 become stored in locations SR0-SR6 (FIG. 5) respectively, as shown in FIG. 6D. Thus, the first word of the first and second packets are loaded into the accumulator.

Figure 6E:
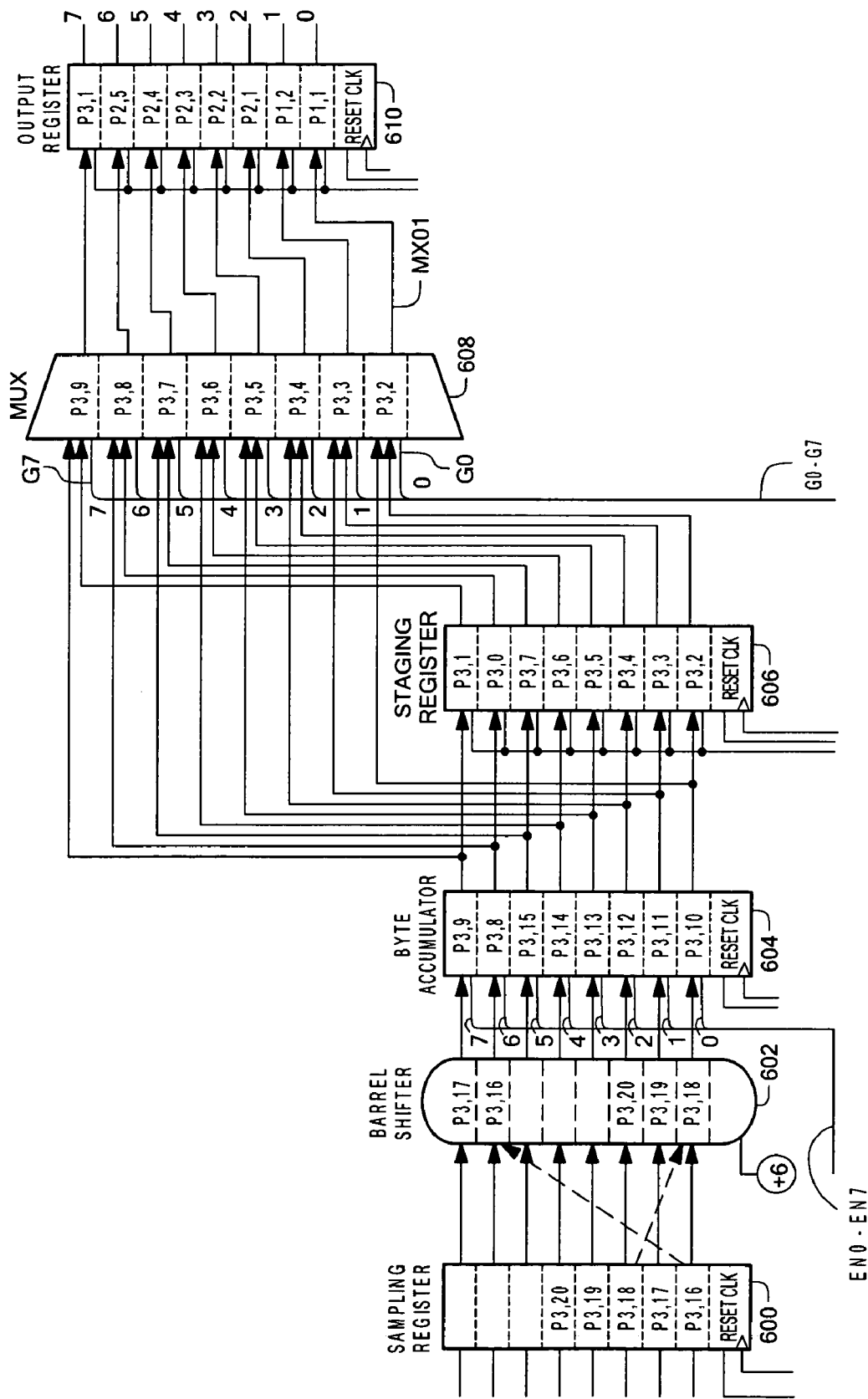

In response to the next LOAD signal the next eight bytes, P3,8-P3,16 are loaded in sampling register locations SR0-SR7, respectively, as shown in FIG. 6D. It is noted that the shift index does not change, but rather remains constant, here 6, for the entire packet. Further, because the valid bytes in the sampling register exceed the number of byte locations available in the accumulator, enable signals EN0-EN7 are asserted and therefore bytes P3,8 to P3,15 are loaded into the positions AC6, AC7, AC0-AC5, respectively, as shown in FIG. 6E on the first clock following the clock signal which loads the sampling register. Thus, the second word of the third packet is loaded into the accumulator.

It is noted that concurrently, the entire contents of the accumulator become stored in staging register 606. More particularly, bytes P3,2 through P3,7, P3,0 and P3,1 become stored in locations SR0-SR7 (FIG. 5) respectively, as shown in FIG. 6E. Thus, the first word of the third packet is loaded in the staging register.

It is noted in FIG. 6E that multiplexer 608 has each one of the sections MX0-MX7 (FIG. 5) fed by two inputs, one from a corresponding one of the locations AC0-AC7 of accumulator 606, respectively, and the other from locations ST0-ST7 of staging register 606. Also fed to the sections MX0-MX7 (FIG. 5) are gating signals on lines G0-G7, respectively, as shown. The controller 506 (FIG. 4) produces a logic signal on each one of the gating signals to form the next set of bytes to be transferred to the global memory.

It is also noted that concurrently with the loading of the accumulator and the loading of the staging register, and referring to FIG. 6E bytes P1_1,P1_2,P2_1,P2_2,P2_3,P2_4, P2_5 and P3_1 at the output of multiplexer 608 become stored in locations OT0-OT7, respectively, of the output register 610.

In response to the next LOAD signal, the final five bytes, P3,16-P3,20 are loaded in sampling register locations SR0-SR4, respectively, as shown in FIG. 6E. The shifter maintains the shift up 6 shift index so that bytes P3,16-P3,20 are at locations SH6, SH7, SH0, SH1 and SH2, respectively, as shown in FIG. 6E.

Figure 6F:
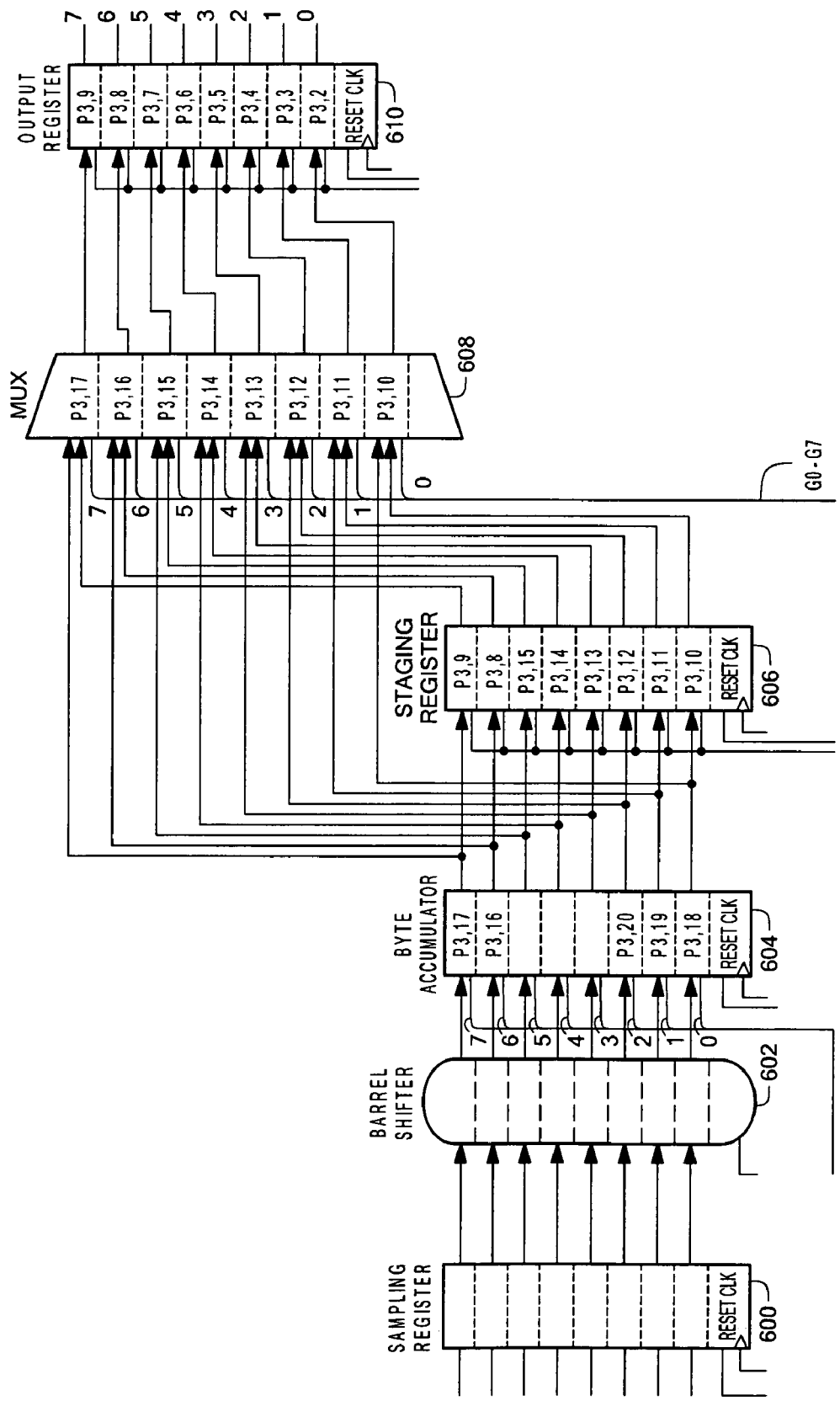

Because the valid bytes in the sampling register exceed the number of byte locations available in the accumulator, enable signals EN0-EN7 are asserted and therefore bytes P3,16 to P3,20 are loaded into the positions AC6, AC7, AC0-AC2, respectively, as shown in FIG. 6F on the first clock following the clock signal which loads the sampling register. Thus, the third word of the third packet is loaded into the accumulator.

It is noted that concurrently, the entire contents of the accumulator become stored in staging register 606. More particularly, bytes P3,10 through P3,15, P3,8 and P3,8 become stored in locations SR0-SR7 (FIG. 5) respectively, as shown in FIG. 6F. Thus, the second word of the third packet is loaded in the staging register.

It is noted that the bytes P3,2, P3,3, P3,4, P3,5. P3,6, P3,7, P3,8 and P3,9 are stored in the output register 610 in proper order for transfer to the QPR. Thus, the gating signals on lines G0-G5 here couple location ST0-ST5 of the staging register 606 to outputs MX0-MX5 of multiplexer 608 (i.e., bytes P3,2, P3,3, P3,4, P3,5, P3,6 and P3,7) while the gating signals on lines G6 and G7 couple locations AC6 and AC7 to the outputs MX6 and MX7 of multiplexer 608 (i.e., bytes P3,8 and P3,9).

Figure 6G:
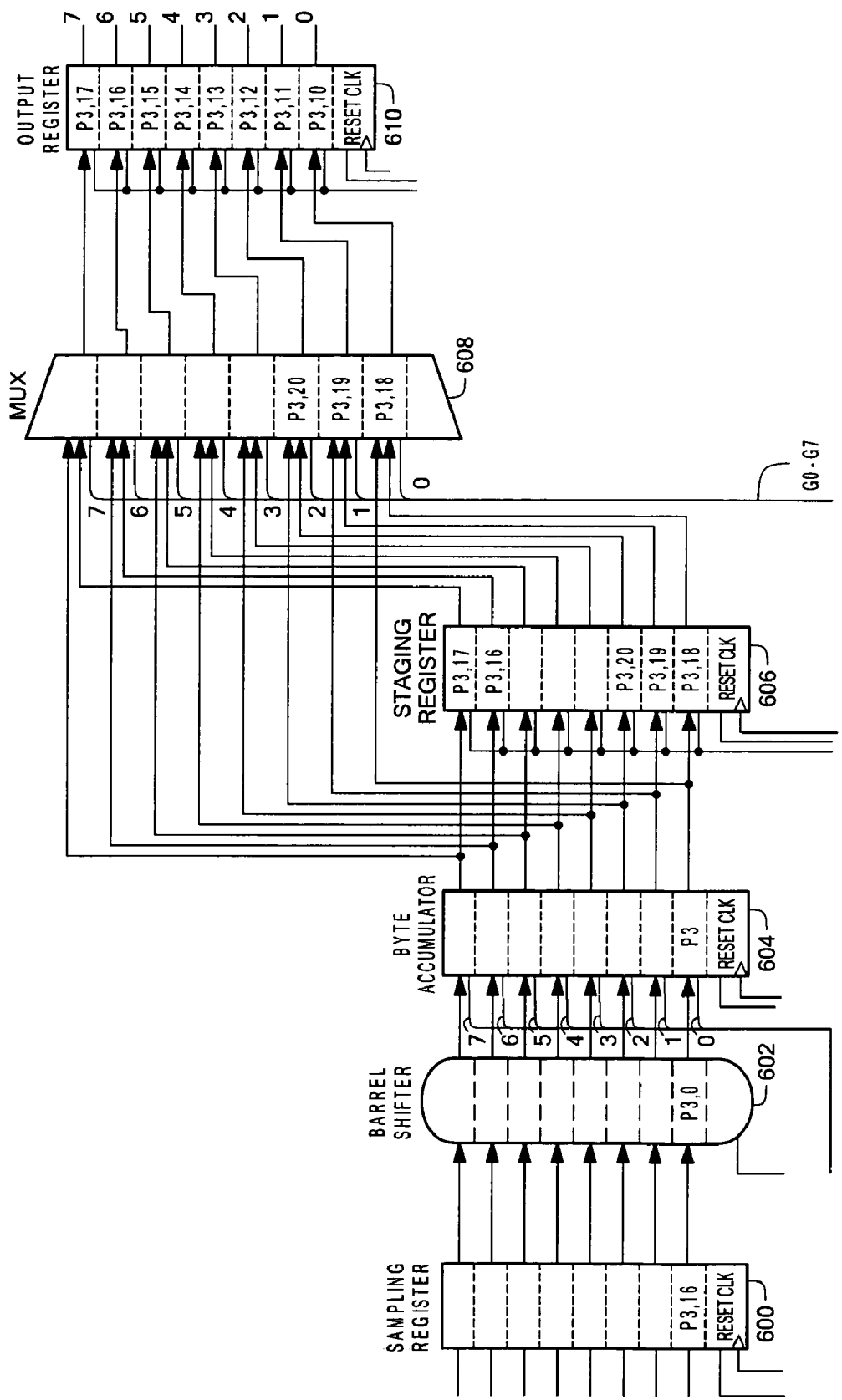

Because this is the last byte of the packet and because the packer knows that this is last packet in the I/O transfer, the contents of the accumulator become loaded into the staging resister thereby "flushing" the accumulator. Referring now to FIG. 6G, in response to the next clock pulse: (1) bytes P3,10 through P3,17 at the outputs MX0-MX7 become stored in locations OT0-OT7, respectively of the output register 610 in proper order for transfer to the QPR; (2) bytes P3,18 and P3,20 locations ST0-ST2, respectively, of staging register 606 as shown in FIG. 6G.

Thus, the gating signals on lines G0-G2 here couple location ST0-ST2 of the staging register 606 to outputs MX0-MX2 of multiplexer 608 (i.e., bytes P3,18, P3,19 and P3,20).

Figure 6H:
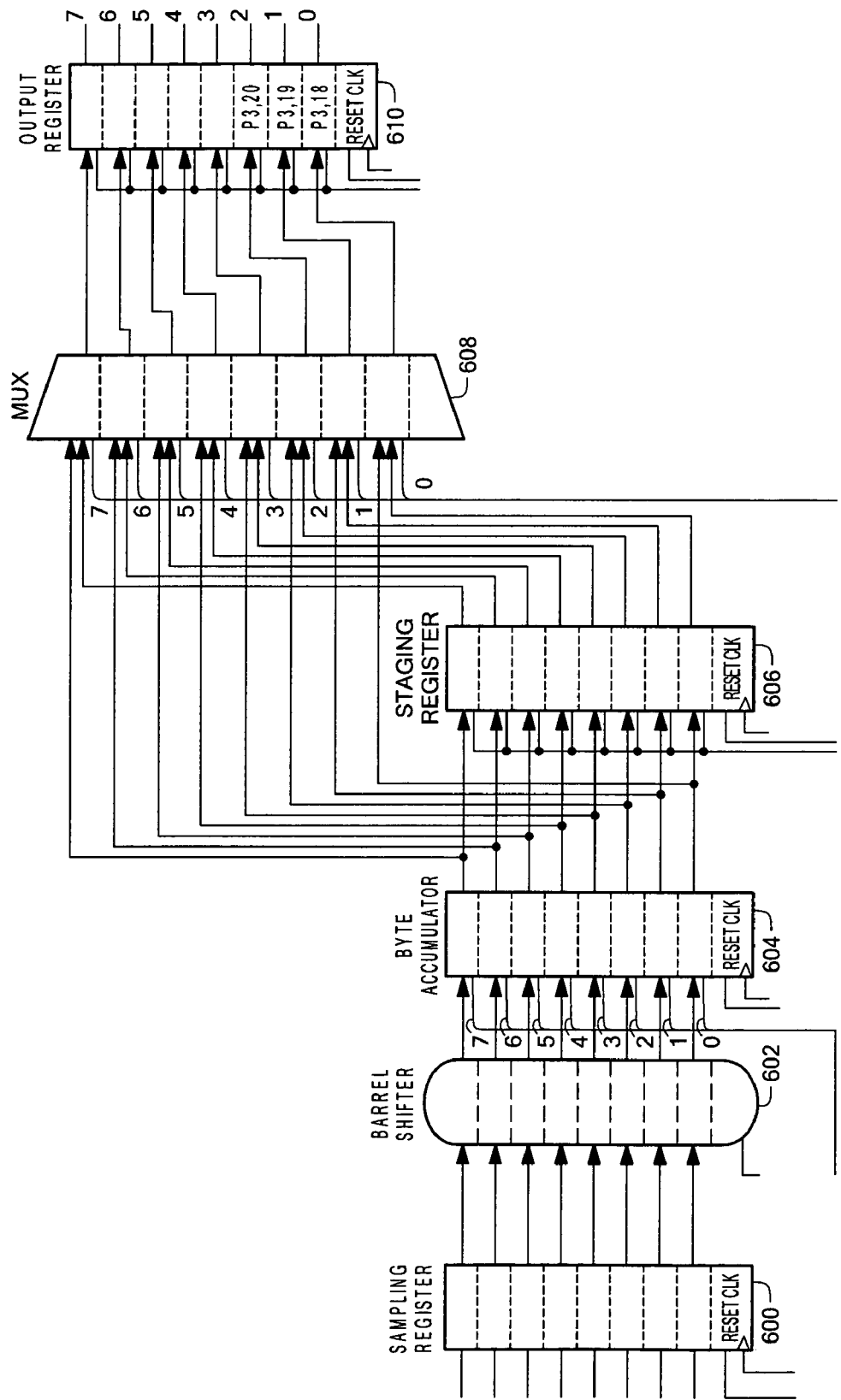

During the next clock pulse CLK, bytes P3,18, P3,19 and P3,20 become stored in locations OT0-OT2 of output register 610 for transfer to the QPR as shown in FIG. 6H.

The QPR now having all bytes from each of the three packets in proper, packed order, negotiates for access to the global cache memory and once granted such access, transfers the three packets to such global cache memory.

Figure 7:
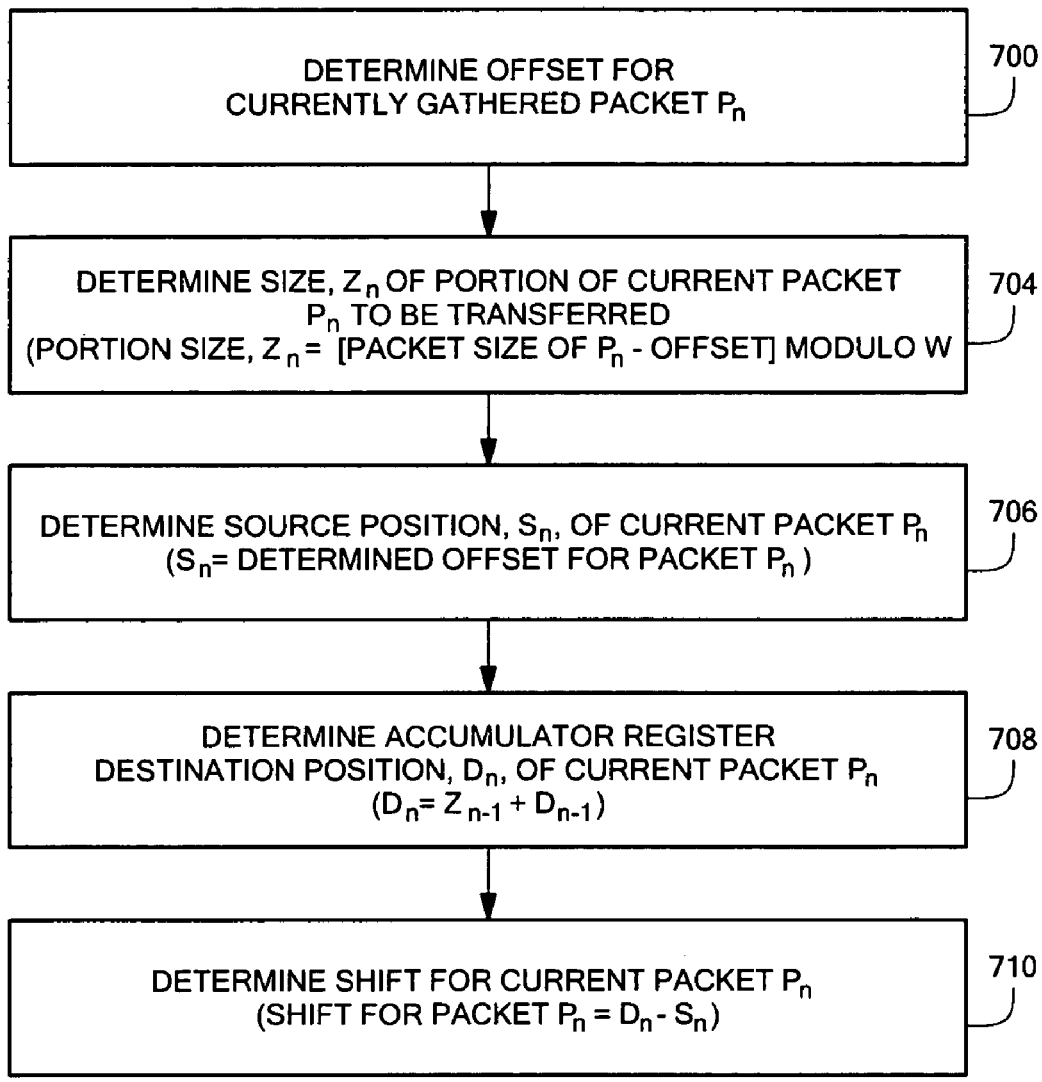
FIG. 7 is a flow diagram of the determination of a shift control signal provided to a barrel shifter used in the byte packer of FIG. 5.
Figure 8:
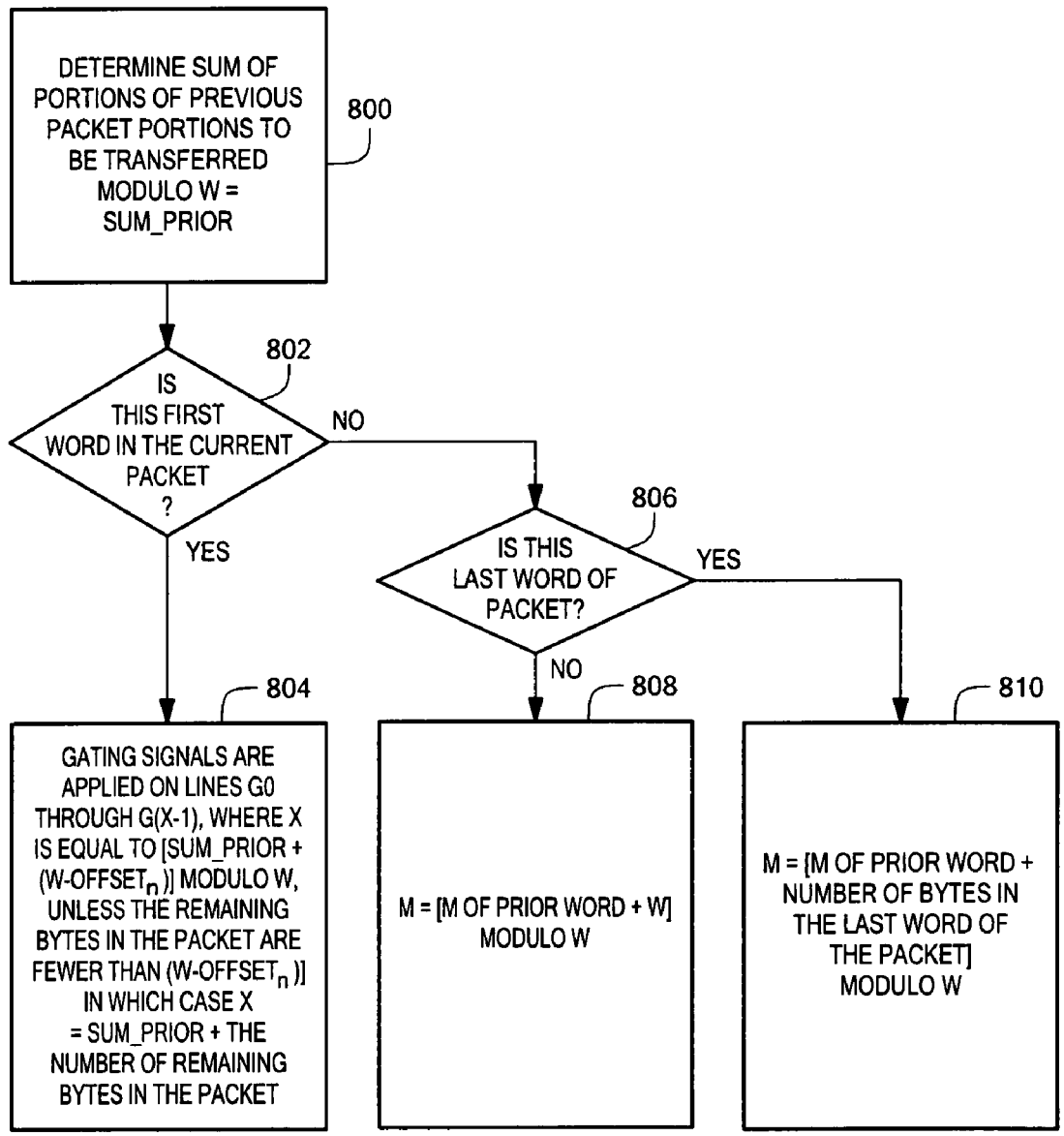
FIG. 8 is a general flow diagram of the determination of a control signal provided to a multiplexer used in the byte packer of FIG. 5.

Considering the determination of the shift control signal for the barrel shifter 602, reference is made to FIG. 7. In Step 700 the offset, $OFFSET_n$, of the packet currently being read from the shared memory, i.e., $P_n$, is determined from the CPU. In Step 704 the size, $Z_n$, of the packet currently being read from the shared memory, i.e., packet $P_n$, is obtain from the CPU. In Step 704, the size, $Z_n$, of the portion of the packet $P_n$ being read from the shared memory is $Z_n=Z_n-OFFSET_n$. In Step 706 the "source" position, $S_n$, of the packet currently being read from the shared memory, i.e., packet $P_n$, is equal to the OFFSET for the packet. In Step 707 the accumulator "destination" position, $D_n$, for the packet currently being read from the shared memory, i.e., packet $P_n$, is calculated as $Z_{n-1}+D_{1-1}$, where $Z_{n-1}$ is the size of the portion of the previous packet $P_{n-1}$ read from the shared memory and $D_{n-1}$ is accumulator "destination" position of the previous packet $P_{n-1}$ read from the shared memory. In Step 710, the shift control signal (i.e., the shift index) to the barrel shifter 602 is calculated for the packet $P_n$ being read from the shared memory as shift of currently read packet=$D_n-S_n$ Referring now to FIG. 8, the process for determining the gating signals on lines G0-G7 for the multiplexer is shown. In Step 800, a considering a packet $P_n$, a determination is made of the sum of the number of valid bytes in all preceding packets for the current I/O transfer, modulo W; herein refereed to as SUM_PRIOR.

In Step 802, a determination is made as to whether this is the first word in packet $P_n$ to be transferred. If it is, gating signals are applied on lines G0 through G(X−1), where X is equal to [SUM_PRIOR plus (W−$OFFSET_n$)] modulo W, Step

804 unless the remaining bytes in the packet are fewer than (W−OFFSET$_n$)] in which case X=SUM_PRIOR plus the number of the remaining bytes in the packet.

If this is the last word in the packet P$_n$, Step 806, X={N of the prior word for the packet P$_n$+W} modulo W, Step 808. If this not the first word in the packet P$_n$ and is not the last word in the packet P$_n$, X=[X of the prior word for the packet P$_n$ plus the number of remaining bytes in the current word being transferred] modulo W, Step 810.

Figure 9:
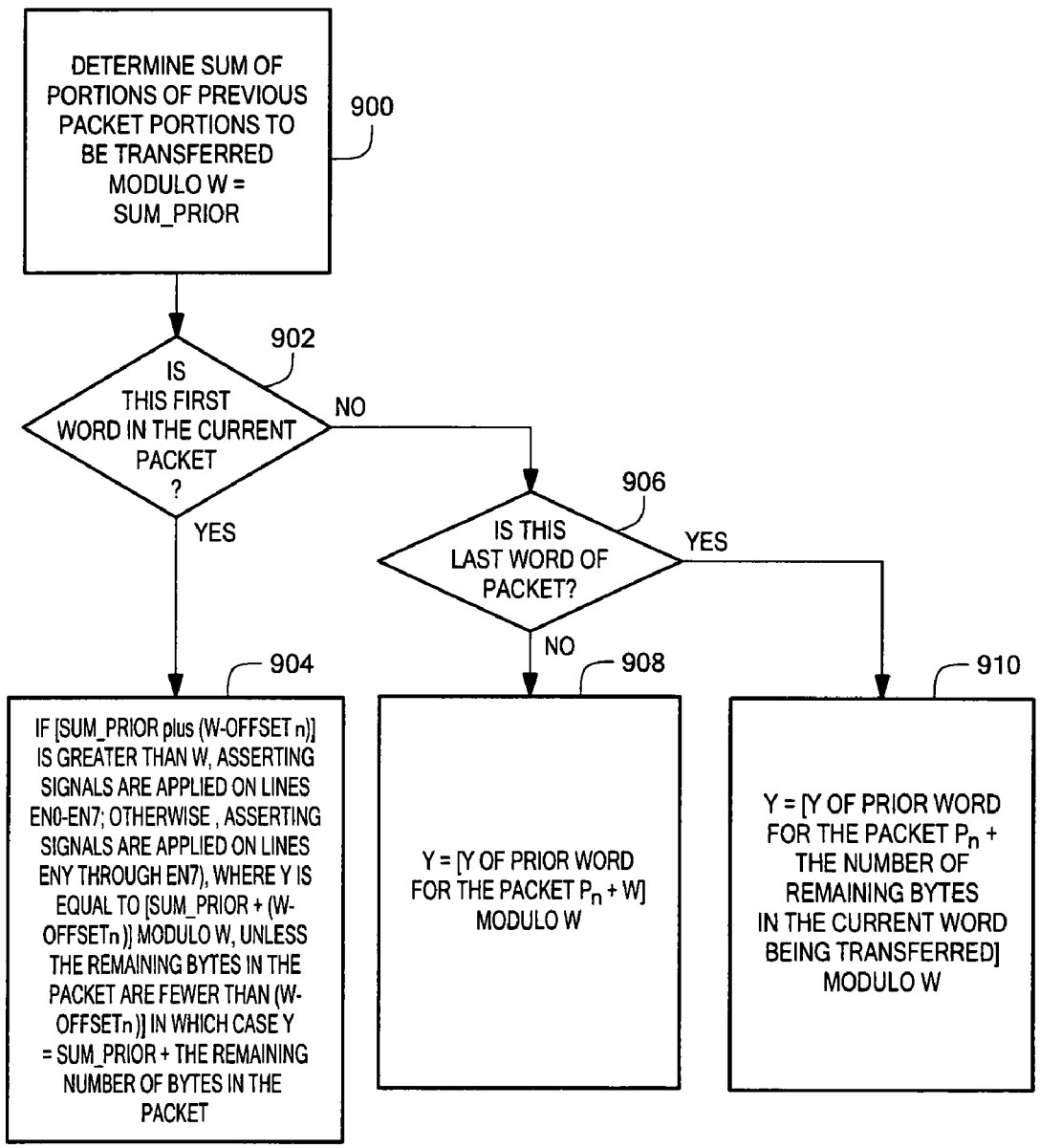
FIG. 9 is a more detailed flow diagram of the determination of a control signal provided to a multiplexer used in the byte packer of FIG. 5.

Referring now to FIG. 9, the process for determining the asserting signals on lines enable lines EN0-EN7 for the accumulator is shown. In Step 900, considering a packet P$_n$, a determination is made of the sum of the number of valid bytes in all preceding packets for the current I/O transfer, modulo W; herein refereed to as SUM_PRIOR.

In Step 902, a determination is made as to whether this is the first word in packet P$_n$ to be transferred. If [SUM_PRIOR plus (W−OFFSET$_n$)] is greater than W, all asserting signal are applied to lines EN0-EN7; otherwise, asserting signals are applied on lines ENY through EN7), where Y is equal to [SUM_PRIOR plus (W−OFFSET$_n$)] modulo W, Step 904 unless the remaining bytes in the packet are fewer than (W−OFFSET$_n$)] in which case Y=SUM_PRIOR plus the number of the remaining bytes in the packet.

If this is the last word in the packet P$_n$, Step 906, Y={Y of the prior word for the packet P$_n$+W} modulo W, Step 908. If this not the first word in the packet P$_n$ and is not the last word in the packet P$_n$, Y=[Y of the prior word for the packet P$_n$ plus the number of remaining bytes in the current word being transferred] modulo W, Step 910.

Figure 10:
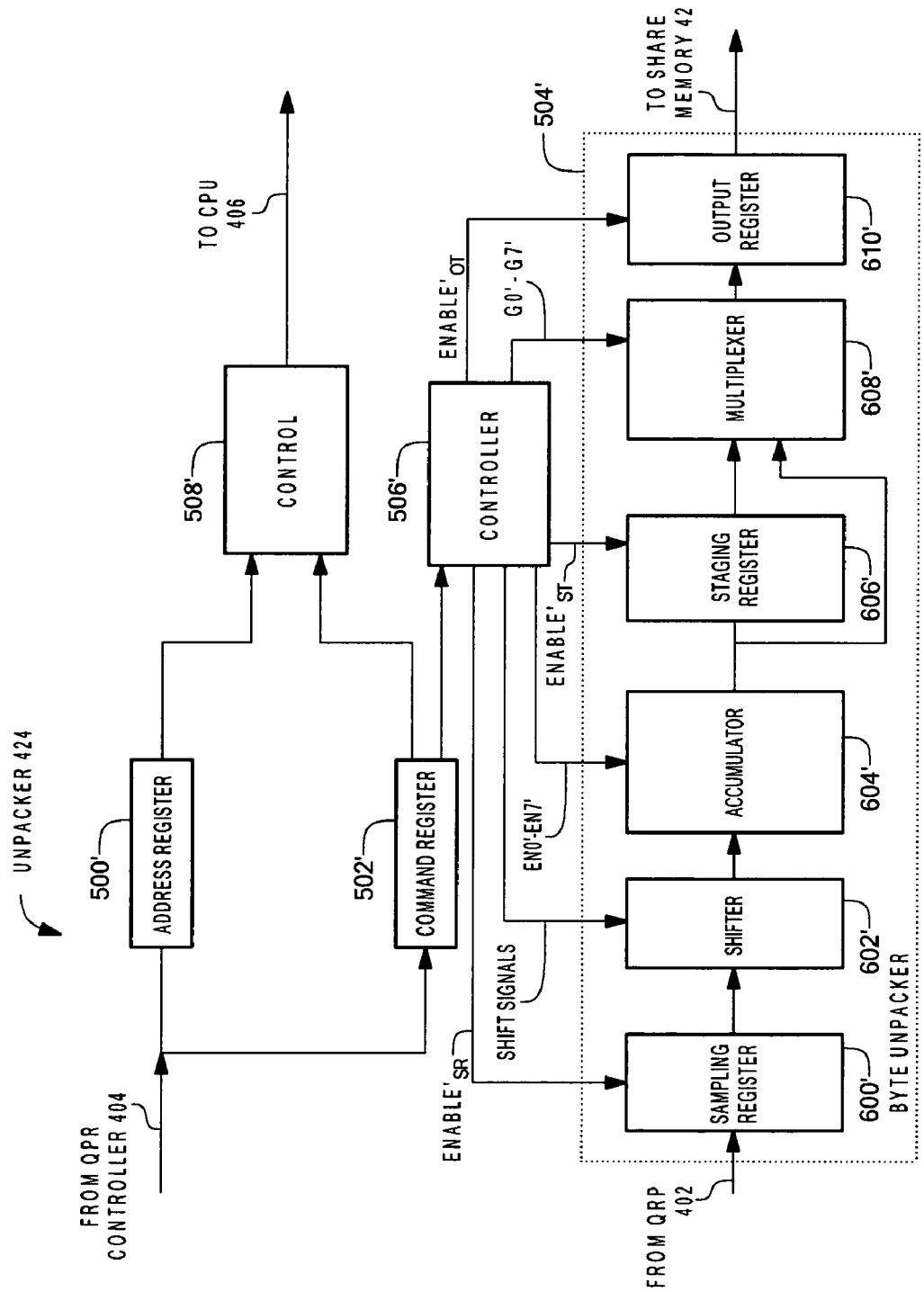
FIG. 10 is a block diagram a unpacker used in the director of FIG. 2 to obtain packets stored contiguously in the global memory as shown in FIG. 3 and distribute such packets among locations in the shared memory as shown in FIG. 3.
Figure 11A:
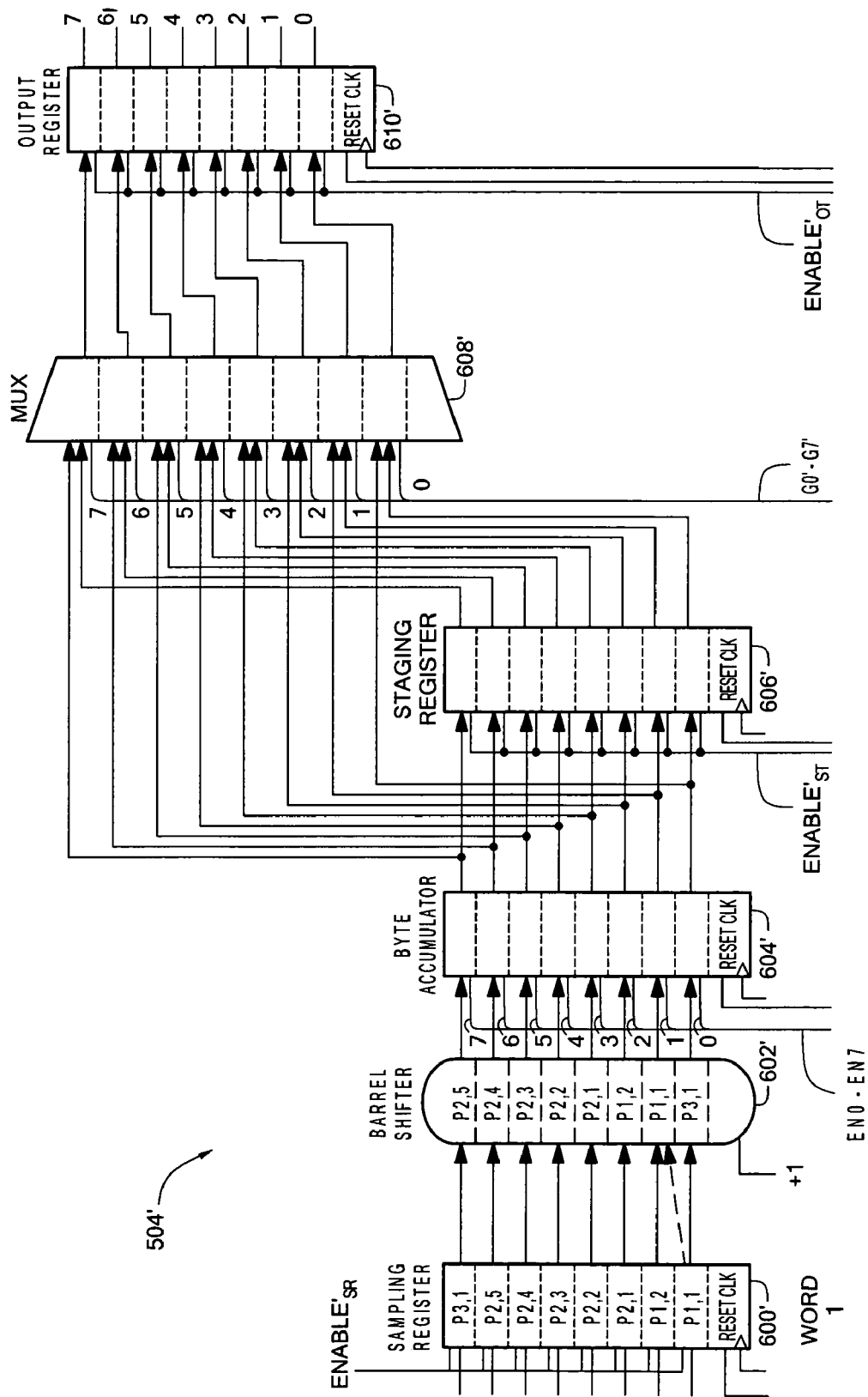
FIG. 11A through FIG. 11J arte useful in understanding the operation of unpacker of FIG. 10.
Figure 11B:
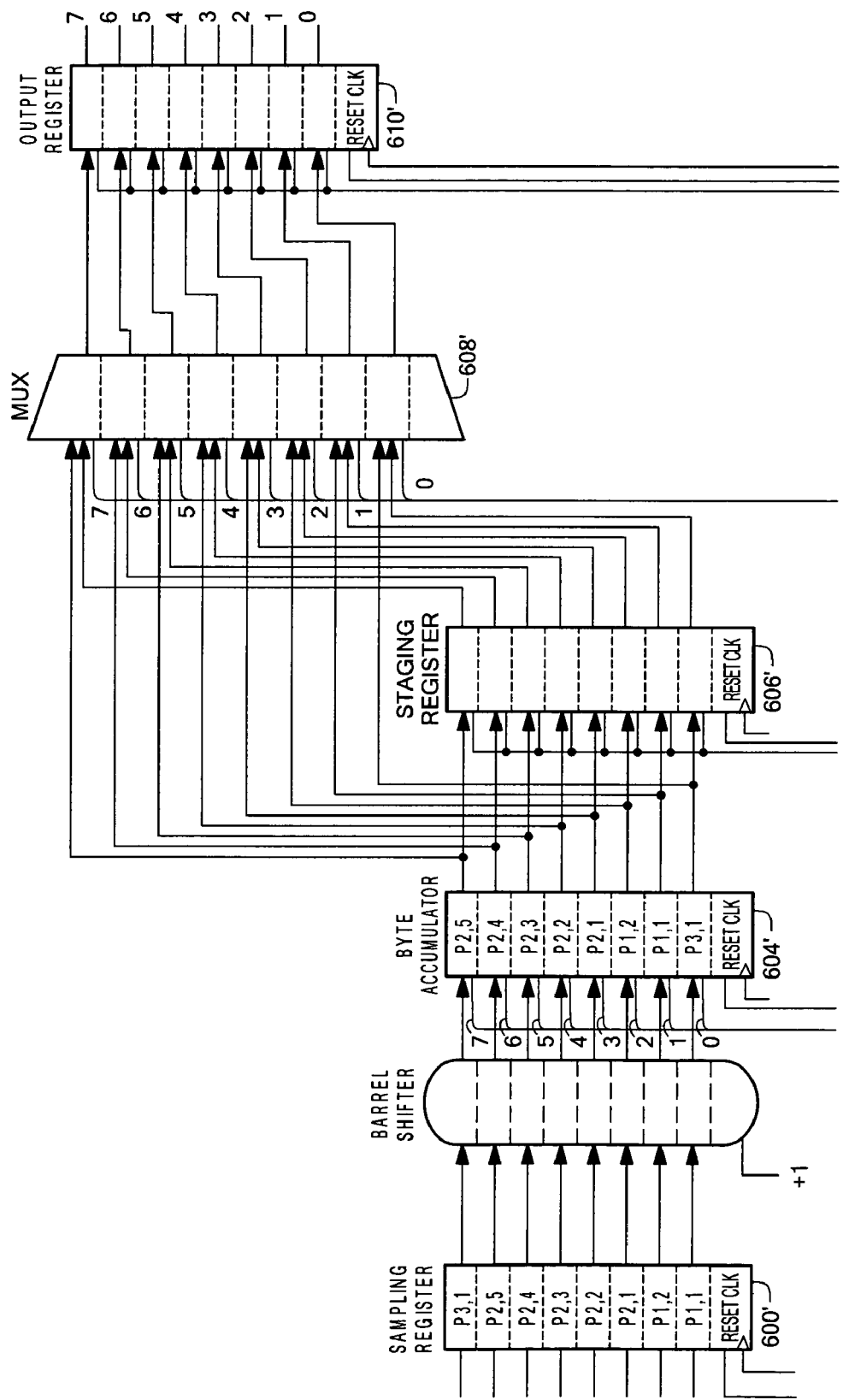
Figure 11C:
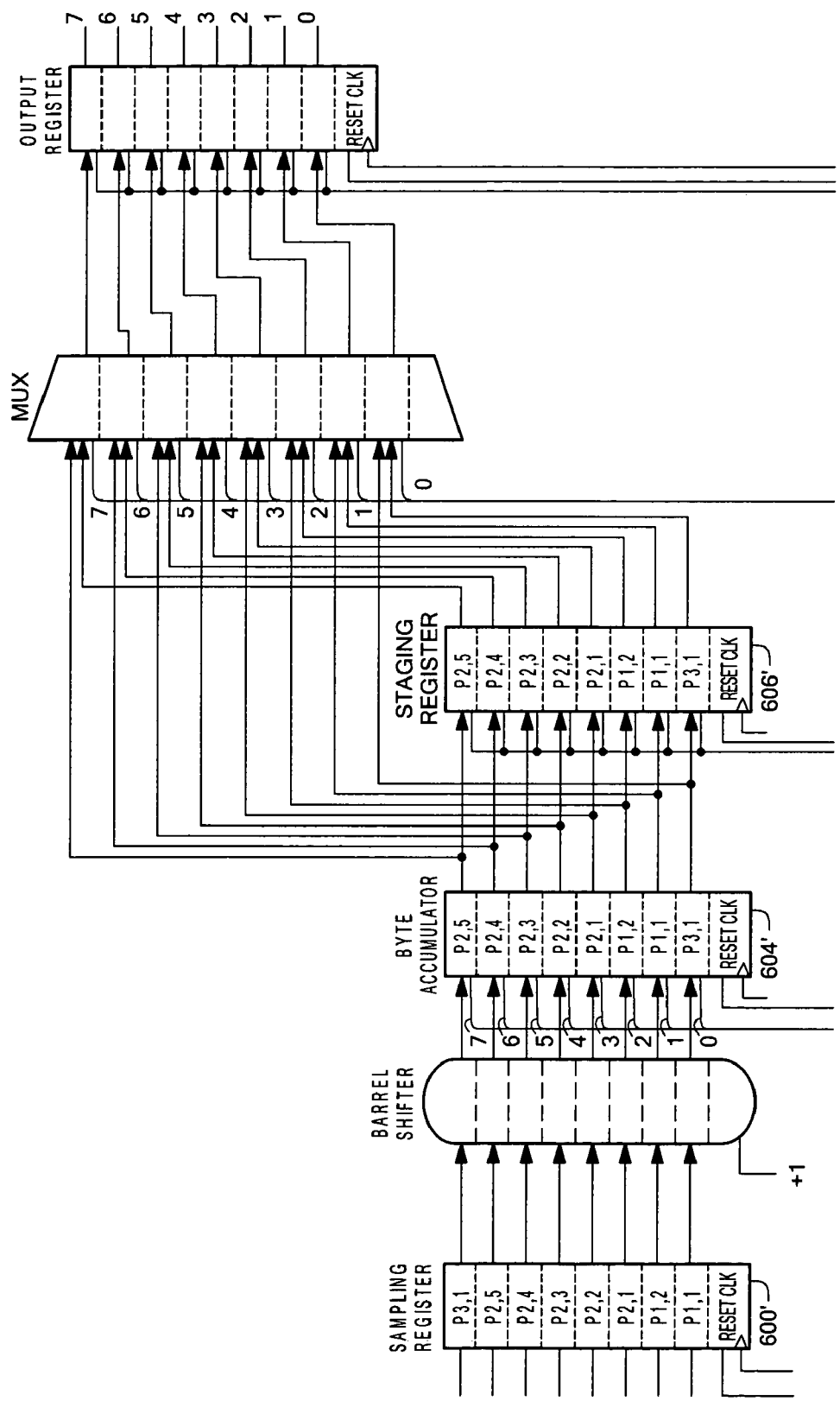
Figure 11D:
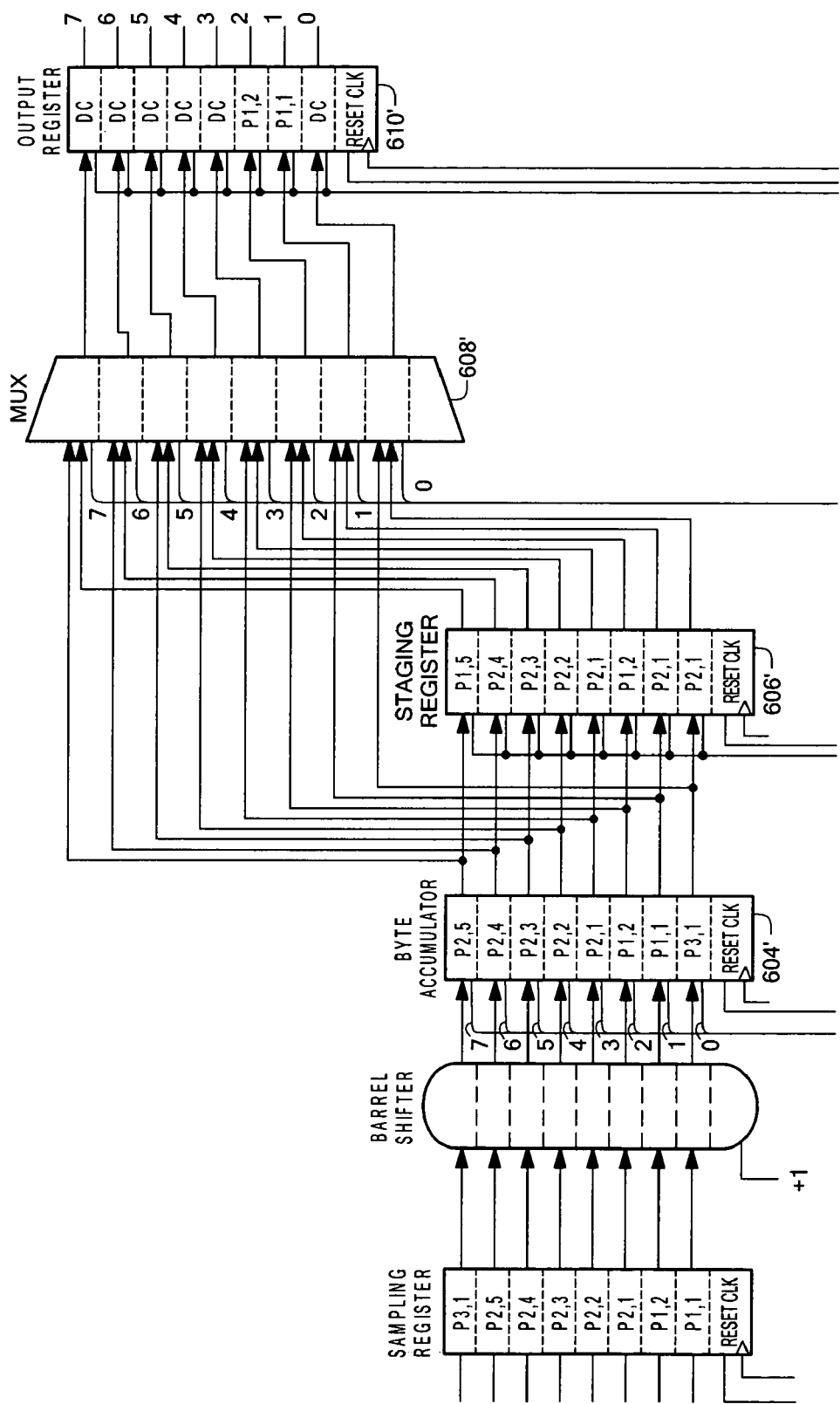
Figure 11E:
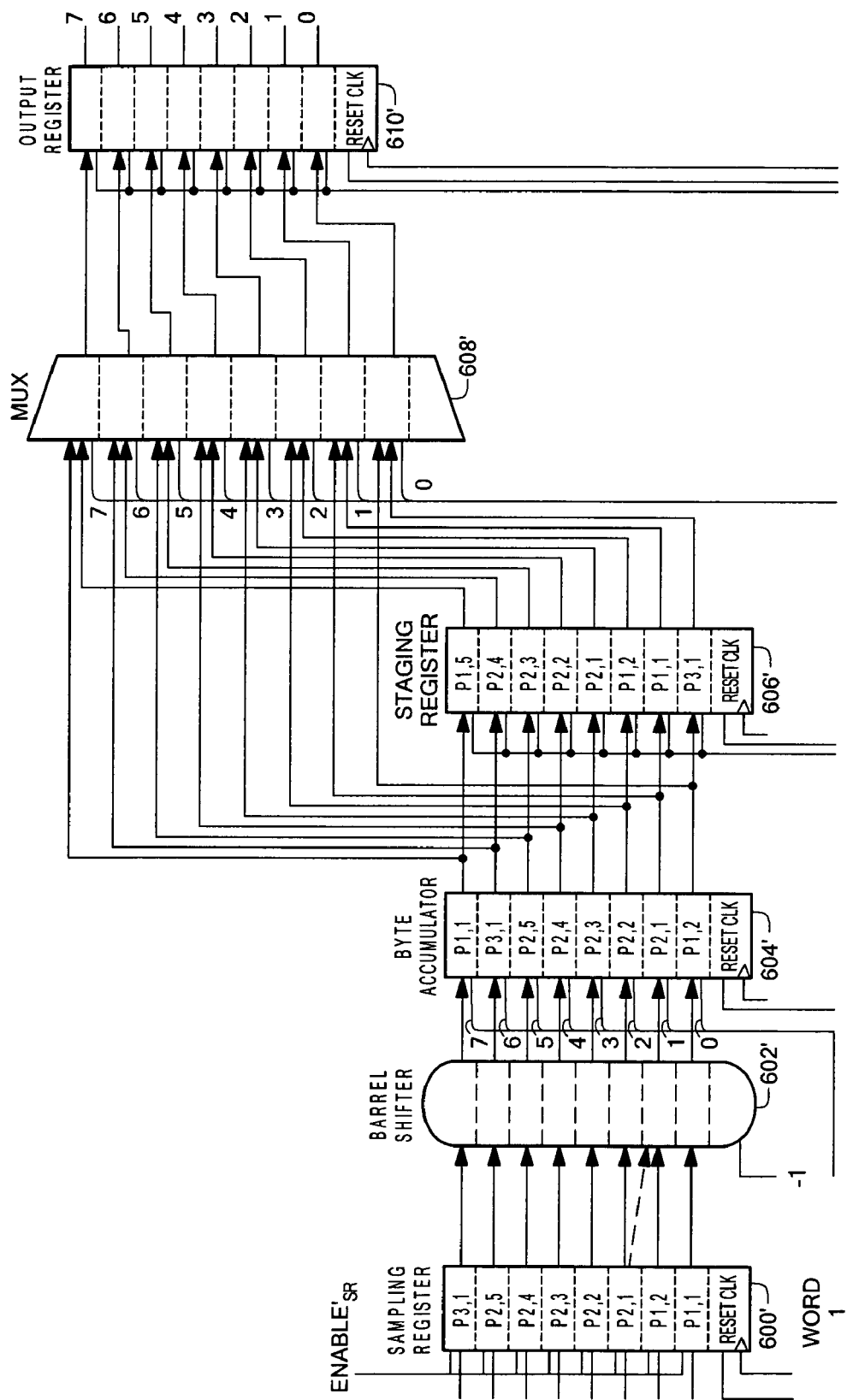
Figure 11F:
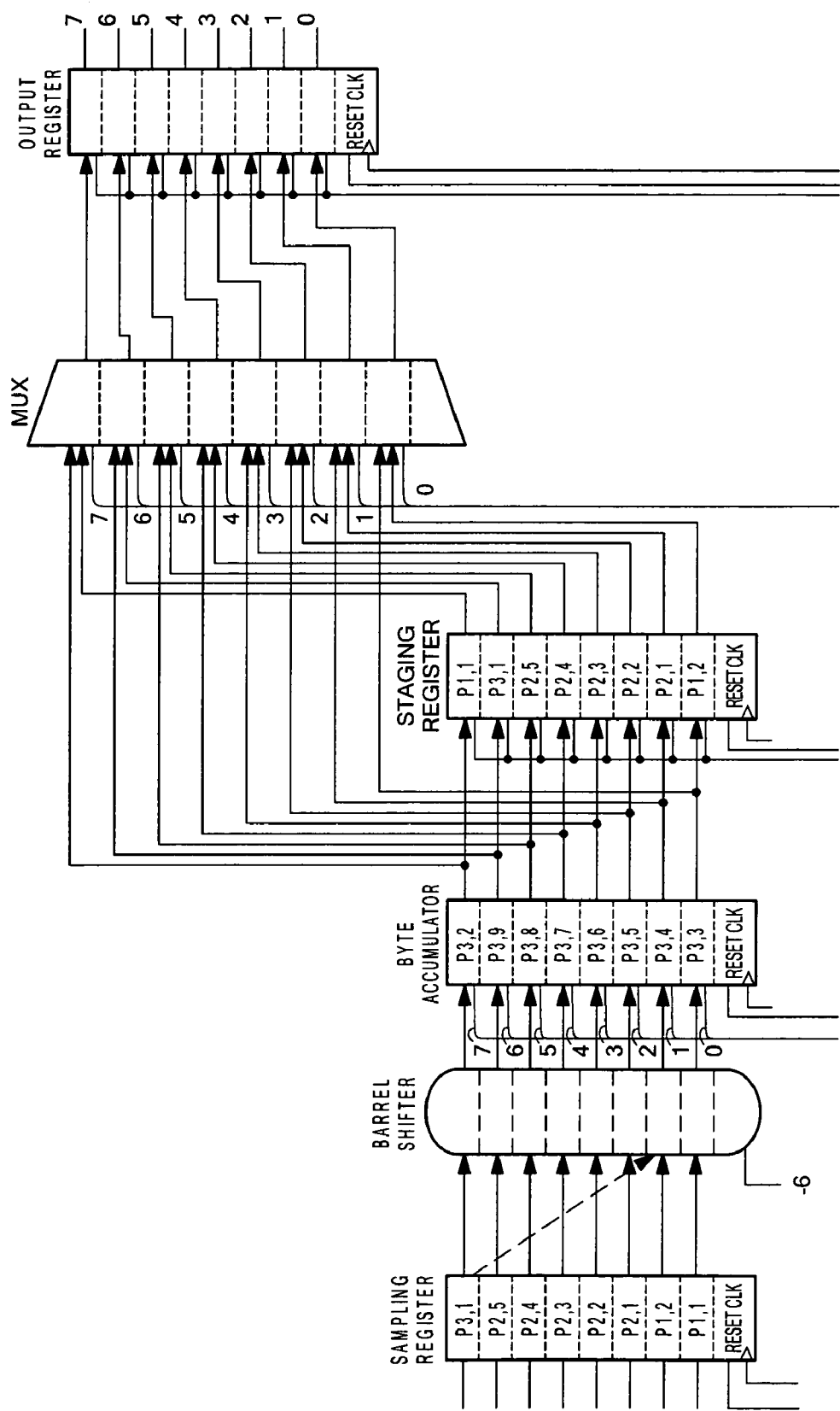
Figure 11G:
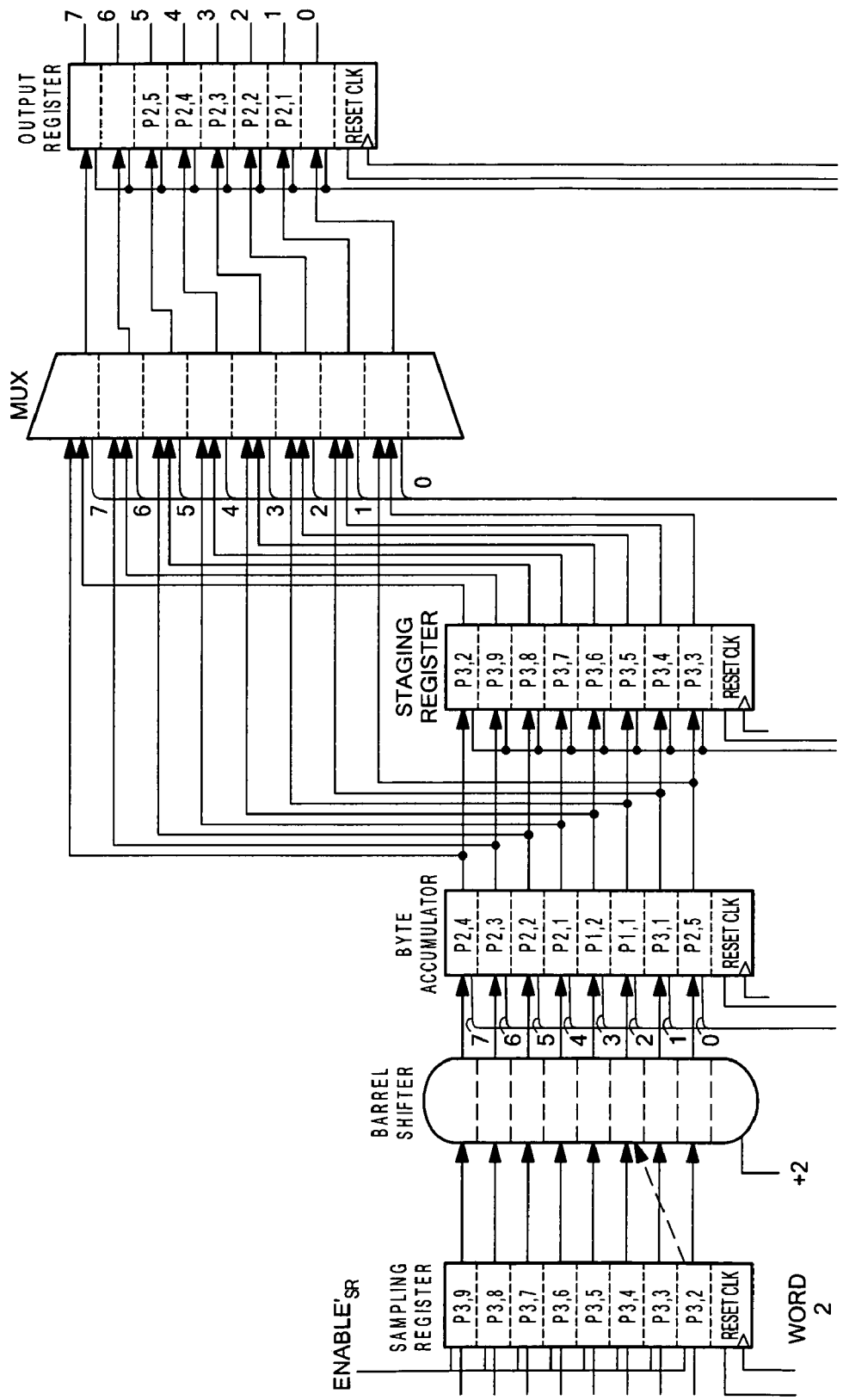
Figure 11H:
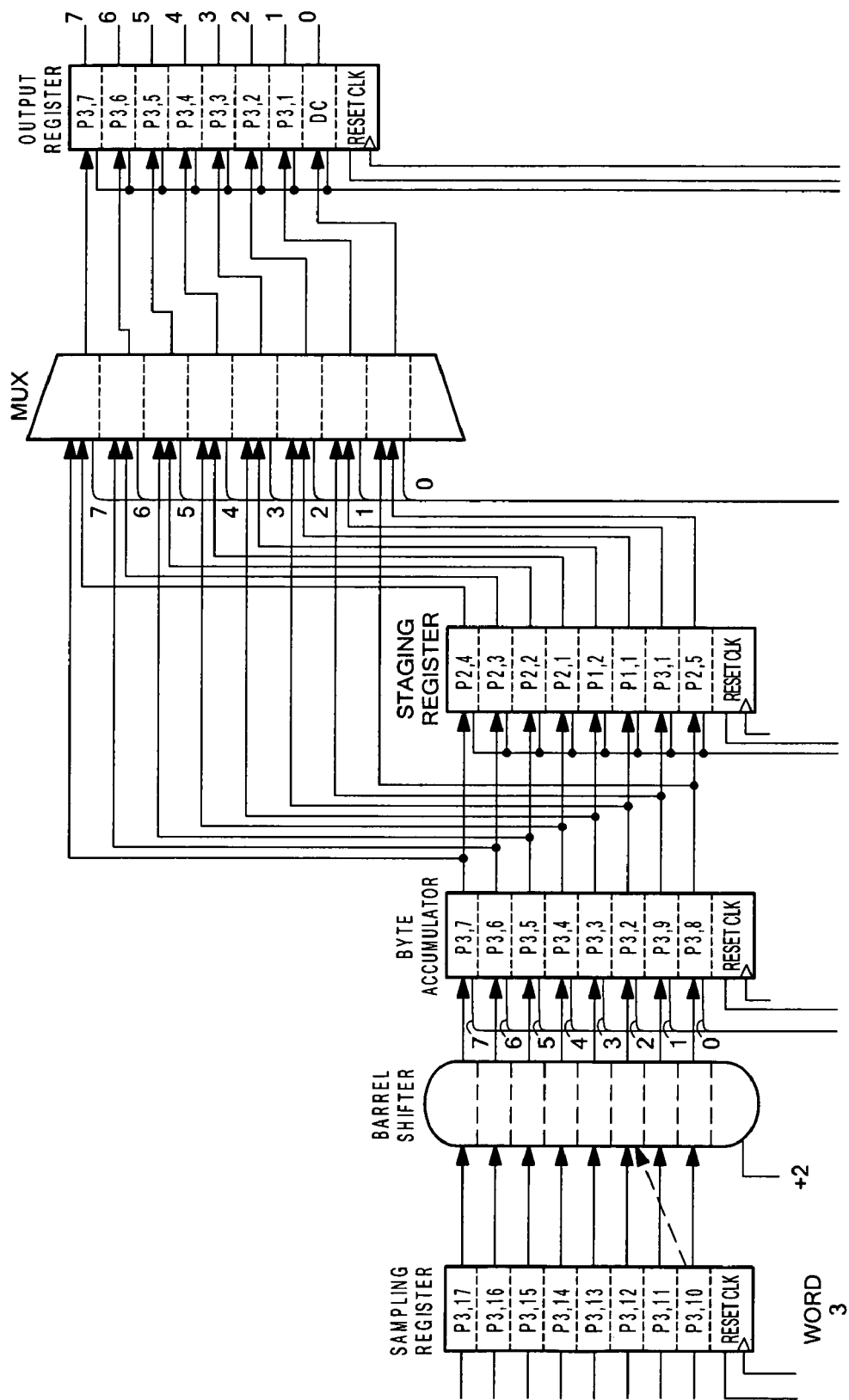
Figure 11I:
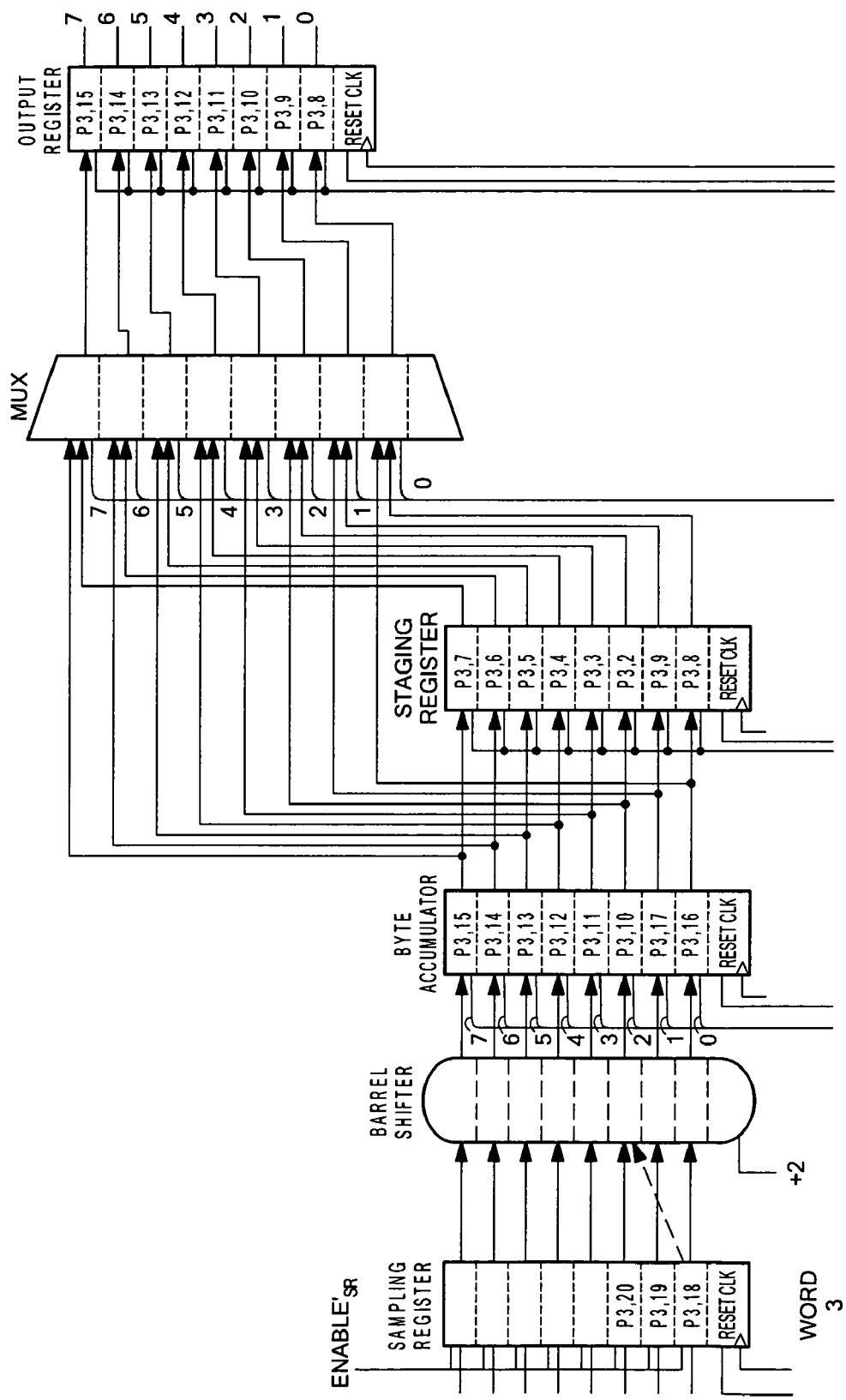
Figure 11J:
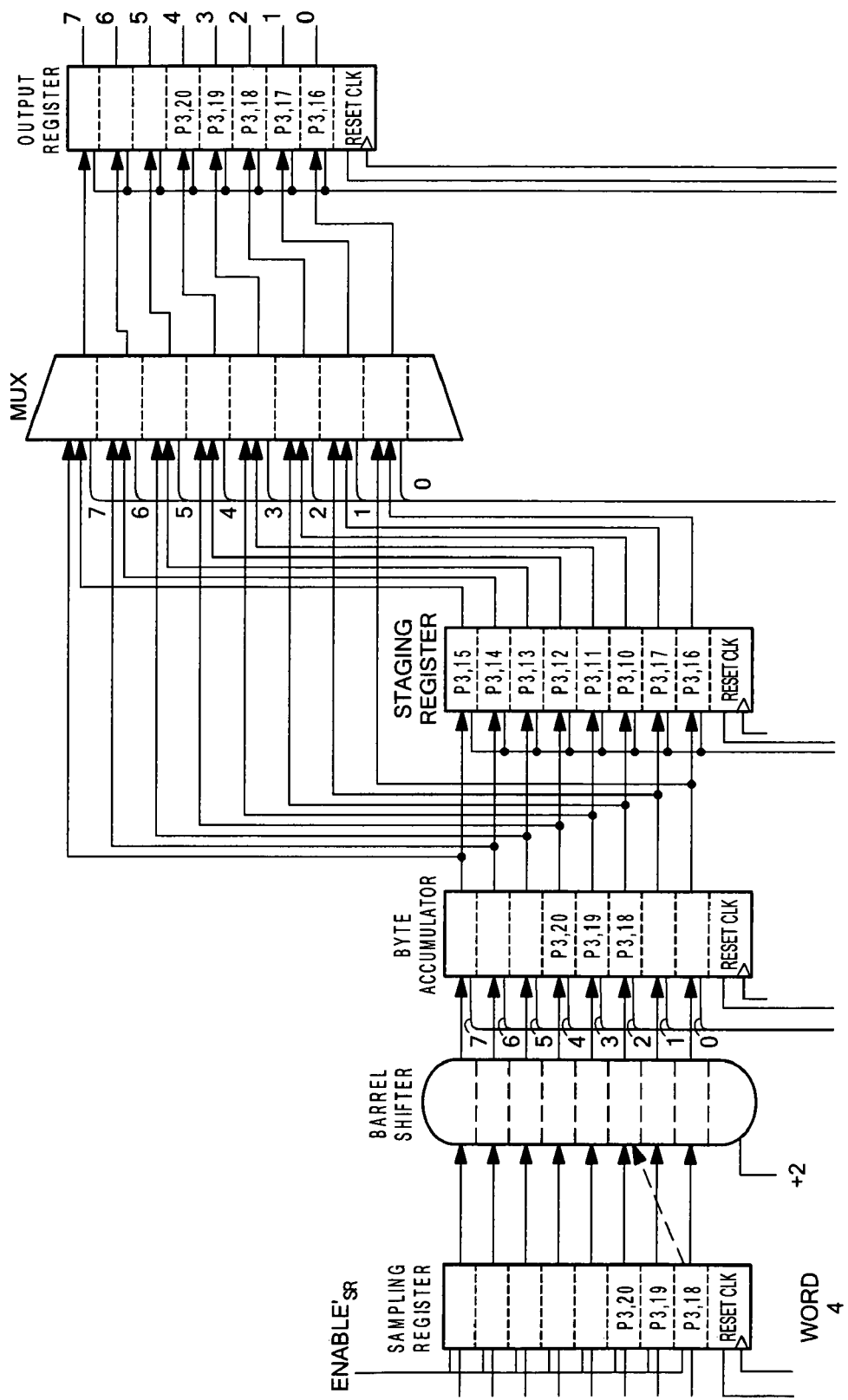

Referring now to FIG. 10, the unpacker 424 is shown to include: a sampling register 600, a barrel shifter 602', an accumulator register 604', a staging register 606', a multiplexer 608', and an output register 610', all arranged as shown in a manner equivalent to the packer 426 except here the sampling register 600' is fed by global cache memory via the QPR and the output register feed the shared memory. The unpacker 602' operates in an equivalent manner with again the CPU providing such things as the offsets, packet size, packet position in the I/O with equivalent elements being designated with a prime (') notation More particularly, referring to FIGS. 11A-11J, the process of taking four words from the global memory and distributing to the shared memory as shown in FIG. 3, is shown. In FIG. 11A, the first word bytes P1,1 through P3,1 are stored in the sampling register 600'. The shift index is +1 and computed in accordance the diagram FIG. 7. The process continues as described above for the packer until the word is passed to the staging register at which time gating signals are fed to the multiplexer so that bytes P1,1 and P1,2 become stored in locations OT1 and OT2, as shown in FIG. 1ID. It is noted that the designation DC means don't care.

Having completed the first word transfer, the unpacker is now re-enabled and the bytes of the remaining words pass through the unpacker in response to shift signals of: −1, and −6 (which is the same as +2, that is a down-shift of six positions is equivalent to an up-shift of two positions), and appropriate gating and enable signals in a generated in a manner equivalent to that described above with the packer, as shown in the FIGS. 11E-11J.

A number of embodiments of the invention have been described. Nevertheless, it will be understood that various modifications may be made without departing from the spirit and scope of the invention. Accordingly, other embodiments are within the scope of the following claims.

What is claimed is:

1. A system for storing a block of data, such block of data comprising different packets of data stored in correspondingly different sections of a memory, and for gathering selected portions of the stored packets and then transferring the selected portions of the gathered packets into a transmitted block of data having the selected portions appended contiguously one to the other, such memory storing the packets in word-based locations, the word-based locations having a common word width, W, the stored packets have a variable number of bytes, the bytes of the gathered selected portions of the stored packets being offset from initial byte positions of the stored packets, the packets having variable offsets, such system comprising:

a sampling register having W byte locations for storing W bytes read from a selected one of the word-based locations of the memory, such read bytes being bytes of a currently gathered one of the packets;

a barrel shifter for shifting the W bytes stored in the sampling register, such W bytes being shifted as a function of: (a) the offset of the currently gathered one of the packets; and (b) the offsets and numbers of bytes in all different, prior gathered packets processed since a current data transfer was initiated to produce W bytes;

an accumulator register having W byte locations for storing the shifted W bytes produced by the barrel shifter in response to a clock pulse;

a staging register having W byte locations, for storing the bytes stored in the accumulator register in response to a subsequent clock pulse; and a multiplexer having W sections, each of the W sections being coupled to a corresponding one of the W byte locations of the accumulator register and a corresponding one of the W byte locations of the staging register, each one of the sections coupling to an output thereof the byte location of the accumulator register or the byte location of the staging register selectively in accordance with the number of bytes in the prior gathered ones of the packets and the number of bytes being gathered from the currently gathered one of the packets to provide at an output of the multiplexer bytes to be transmitted as the transmitted block of data having the selected portions appended contiguously one to the other.

2. A system for distributing different packets of data stored in continuous locations of a memory, such memory storing the packets in word-based locations, the word-based locations having a common word width, W, the stored packets have a variable number of bytes, the bytes of the distributed packets to be offset from initial byte positions, the offsets being variable, such system comprising:

a sampling register having W byte locations for storing W bytes read from a selected one of the word-based locations of the memory, such read bytes being bytes of a currently distributed one of the packets;

a barrel shifter for shifting the bytes stored in the sampling register, such W bytes being shifted as a function of: (a) the offset of the currently distributed one of the packets; and (b) the offsets and numbers of bytes in all different, prior gathered packets processed since a current data transfer was initiated to produce W bytes;

an accumulator register having W byte locations for storing the shifted W bytes produced by the barrel shifter in response to a clock pulse;

a staging register having W byte locations, for storing the bytes stored in the accumulator register in response to a subsequent clock pulse; and a multiplexer having W sections, each of the W sections being coupled to a corresponding one of the W byte locations of the accumulator register and a corresponding one of the W byte locations of the staging register, each one of the sections coupling to an output thereof the byte location of the accumulator register or the byte location of the staging register selectively in accordance with the number of bytes in the prior distributed ones of the packets and the number of bytes being distributed from the currently distributed one of the packets to provide at an output of the multiplexer.

* * * * *